(12) United States Patent
Cremelie et al.

(10) Patent No.: US 8,060,715 B2
(45) Date of Patent: Nov. 15, 2011

(54) SYSTEMS AND METHODS FOR CONTROLLING INITIALIZATION OF A FINGERPRINT CACHE FOR DATA DEDUPLICATION

(75) Inventors: Nick Cremelie, Ghent (BE); Bastiaan Stougie, Melle (BE)

(73) Assignee: Symantec Corporation, Mountain View, CA (US)

( * ) Notice: Subject to any disclaimer, the term of this patent is extended or adjusted under 35 U.S.C. 154(b) by 323 days.

(21) Appl. No.: 12/415,861

(22) Filed: Mar. 31, 2009

(65) Prior Publication Data

US 2010/0250858 A1    Sep. 30, 2010

(51) Int. Cl.
*G06F 12/08* (2006.01)
*G06F 12/12* (2006.01)

(52) U.S. Cl. ............... 711/162; 711/118; 711/E12.021; 711/E12.069; 711/E12.04

(58) Field of Classification Search .......... 711/162, 711/118, E12.04, E12.021, E12.069
See application file for complete search history.

(56) References Cited

U.S. PATENT DOCUMENTS

| 7,814,149 | B1 | 10/2010 | Stringham | |
|---|---|---|---|---|
| 2004/0187075 | A1 | 9/2004 | Maxham et al. | |
| 2006/0095470 | A1 | 5/2006 | Cochran et al. | |
| 2008/0201140 | A1* | 8/2008 | Wells et al. | 704/231 |
| 2010/0114833 | A1 | 5/2010 | Mu | |

OTHER PUBLICATIONS

U.S. Appl. No. 12/415,847, filed Mar. 31, 2009, Cremelie, Nick.
U.S. Appl. No. 12/415,876, filed Mar. 31, 2009, Cremelie, Nick.
"Cache Purging and Seeding . . . "; (accessed May 15, 2009); Toolbox for IT Groups.
"Filter Package";(accessed on May 15, 2009); http://www.cs.indiana.edu/~rawlins/website/documentation/filter-package.html.
Klein, Amit; "OpenBSD DNS Cache Poisoning and Multiple O/S Predictable IP ID Vulnerability"; March 13, 2008.
vol. 46 No. 2; Japan; http://sciencelinks.jp/j-east/article/200504/000020050405A0133985.php.
"Server Side Caching"; (accessed May 19, 2009); http://www.sitemasters.be/tutorials/1/1/255/Addow/Server_Side_Caching.
"Caching: Work the Server and Client Side, and Everyone Benefits"; Jul. 22, 2004; Web Developement.
Hartman, John H.; "SIFS"; Fall 2007; (accessed on May 15, 2009); http://www.cs.arizona.edu/classes/cs552/fall07/sifs/sifs.pdf.
"Configuring the OpenDS Directory Server With dsconfig"; (accessed May 15, 2009); https://www.opends.org/1.0/page/ConfiguringOpenDSUsingTheDsconfigTool.
Smiley, John; "Installing Oracle RAC 10g Release 1 on Linux x86"; (accessed May 15, 2009); http://www.oracle.com/technology/pub/articles/smiley_rac10gr1_install.html.

(Continued)

*Primary Examiner* — Yong Choe
(74) *Attorney, Agent, or Firm* — Advantedge Law Group

(57) ABSTRACT

A computer-implemented method for controlling initialization of a fingerprint cache for data deduplication associated with a single-instance-storage computing subsystem may comprise: 1) detecting a request to store a data selection to the single-instance-storage computing subsystem, 2) leveraging a client-side fingerprint cache associated with a previous storage of the data selection to the single-instance-storage computing subsystem to initialize a new client-side fingerprint cache, and 3) utilizing the new client-side fingerprint cache for data deduplication associated with the request to store the data selection to the single-instance-storage computing subsystem. Other exemplary methods of controlling initialization of a fingerprint cache for data deduplication, as well as corresponding exemplary systems and computer-readable-storage media, are also disclosed.

20 Claims, 12 Drawing Sheets

OTHER PUBLICATIONS

Engerbretsen, Joan; "Fingerprint-based remote control for IPTV debuts"; Sep. 15, 2006; http://telephonyonline.com/iptv/marketing/remote_control_iptv_091506/.

"Cache algorithms"; (accessed May 15, 2009); Wikipedia; http://en.wikipedia.org/wiki/Cache_algorithms.

Devera, Martin; "How to find the best VM strategy for Linux"; (accessed May 15, 2009); http://luxik.cdi.cz/~devik/bestvm.htm.

"Email::Fingerprint::Cache—Cache observed email fingerprints"; (accessed May 15, 2009); http://search.cpan.org/~budney/Email-Fingerprint-0.24/lib/Email/Fingerprint/Cache.pm.

Silverman, Richard E.; "Re: want to automate PSFTP, skip fingerprint cache/prompt?"; Aug. 6, 2003; http://www.derkeiler.com/Newsgroups/comp.security.ssh/2003-08/0061.html.

"Single Instance Storage in Exchange 2007"; (accessed on May 15, 2009); The Microsoft Exchange Team Blog; http://msexchangeteam.com/archive/2008/02/08/448095.aspx.

"Single Instance Storage in Microsoft Windows Storage Server 2003 R2";May 2006; Microsoft; http://download.microsoft.com/download/8/a/e/8ae7f07d-b888-4b17-84c3-e5a1976f406c/.

Non-Final Office Action Received in U.S. Appl. No. 12/415,847; Mar. 31, 2011.

Non-Final Office Action Received in U.S. Appl. No. 12/415,876; Mar. 24, 2011.

* cited by examiner

SYSTEMS AND METHODS FOR CONTROLLING INITIALIZATION OF A FINGERPRINT CACHE FOR DATA DEDUPLICATION

BACKGROUND

Data deduplication is a technique that may be used to reduce the amount of storage space used in a single-instance data storage system by detecting and preventing redundant copies of data from being stored to the single-instance data storage system. For example, data deduplication is often used to reduce the amount of storage space needed to maintain backups of an organization's data.

In order to perform data deduplication, a system needs to be able to identify redundant copies of the same data. Because of the processing requirements involved in comparing each incoming unit of data with each unit of data that is already stored in a single-instance data storage system, the detection is usually performed by the system generating and comparing smaller data signatures ("fingerprints") of each data unit instead of comparing the data units themselves. The detection generally involves generation of a new fingerprint for each unit of data to be stored to the single-instance data storage system and comparison of the new fingerprint to existing fingerprints of data units already stored by the single-instance data storage system. If the new fingerprint matches an existing fingerprint, a copy of the unit of data is likely already stored in the single-instance data storage system.

Existing data deduplication techniques often require significant computing resources, especially for single-instance data storage systems storing large amounts of data and/or for requests to store large volumes of data to a single-instance data storage system. For example, existing client-side data deduplication techniques often use significant computing resources of a server-side device and/or significant bandwidth resources to transport large numbers of queries from a client-side device to a server-side single-instance data storage system. In particular, with existing data deduplication techniques, initialization of a client-side cache to be used for client-side data deduplication may require that numerous queries be transmitted to the server-side single-instance data storage system.

SUMMARY

As will be described in greater detail below, the instant disclosure generally relates to systems and methods for controlling initialization of a fingerprint cache for data deduplication associated with a single-instance-storage computing subsystem. In one example, a method for performing such a task may comprise: 1) detecting a request to store a data selection to the single-instance-storage computing subsystem, 2) leveraging a client-side fingerprint cache associated with a previous storage of the data selection to the single-instance-storage computing subsystem to initialize a new client-side fingerprint cache, and 3) utilizing the new client-side fingerprint cache for data deduplication associated with the request to store the data selection to the single-instance-storage computing subsystem. Other exemplary methods of controlling initialization of a fingerprint cache for data deduplication, as well as corresponding exemplary systems and computer-readable-storage media, are also disclosed.

In some examples, leveraging of a client-side fingerprint cache associated with a previous storage (e.g., a most recent previous backup) of a data selection to the single-instance-storage computing subsystem may include 1) utilizing client-side storage-event data to detect at least one change made to the data selection since the previous storage of the data selection to the single-instance-storage computing subsystem and 2) updating the client-side fingerprint cache associated with the previous storage of the data selection to the single-instance-storage computing subsystem to form the new client-side fingerprint cache reflecting the change(s) to the data selection. The updating of the client-side fingerprint cache may synchronize fingerprints in the client-side fingerprint cache with up-to-date server-side fingerprint data associated with the most recent previous storage of the data selection to the single-instance-storage computing subsystem.

In other examples, leveraging of a client-side fingerprint cache associated with a previous storage (e.g., a most recent previous backup) of a data selection to the single-instance-storage computing subsystem may include: 1) transmitting a cache-verification request to the single-instance-storage computing subsystem seeking verification of fingerprints in the client-side fingerprint cache associated with the previous storage of the data selection to the single-instance-storage computing subsystem, 2) receiving a cache-verification response from the single-instance-storage computing subsystem, and 3) building the new client-side fingerprint cache based on the cache-verification response and the client-side fingerprint cache associated with the previous storage of the data selection to the single-instance-storage computing subsystem. The verification request and response may be used to build the new client-side fingerprint cache such that the new client-side fingerprint cache includes only fingerprints that are consistent with up-to-date server-side fingerprint data associated with the most recent previous storage of the data selection to the single-instance-storage computing subsystem.

By proceeding in this or a similar manner, the exemplary systems and methods described herein may leverage a client-side fingerprint cache associated with a previous storage of a data selection to a single-instance-storage computing subsystem to initialize a new client-side fingerprint cache for use in data deduplication. Accordingly, an expensive full initialization of a client-side fingerprint cache may be avoided or postponed, thereby reducing cache initialization overhead that would otherwise be required for a full initialization of a client-side fingerprint cache. For example, a leveraged initialization of a client-side fingerprint cache may help reduce or eliminate queries that would otherwise be transmitted from a client-side device to a server-side side in order to perform a full initialization of a client-side fingerprint cache.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
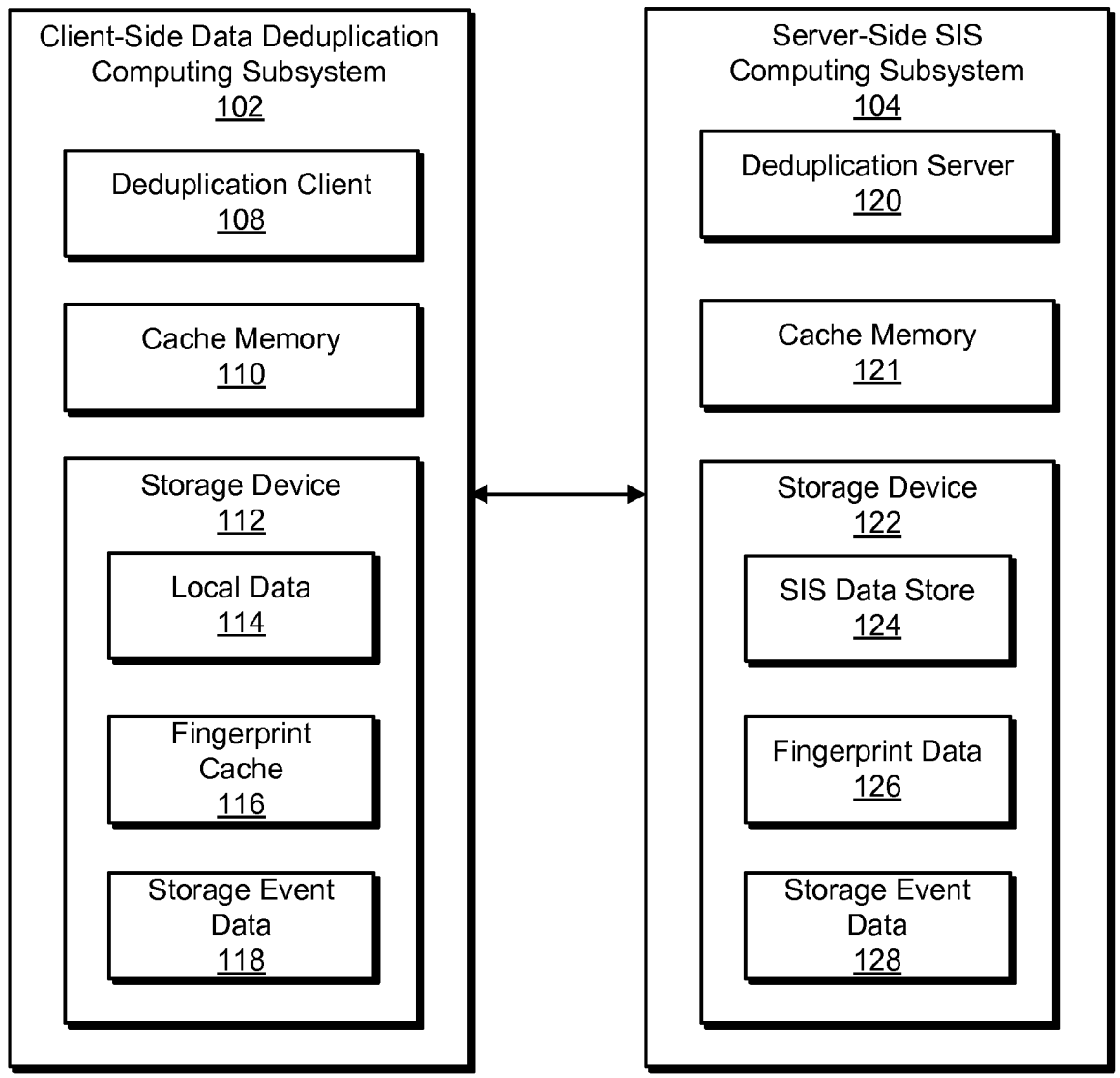
FIG. 1 is a block diagram of an exemplary system for controlling initialization of a fingerprint cache for data duplication according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for controlling initialization of a fingerprint cache for data deduplication associated with a single-instance data storage system. For example, exemplary systems and methods disclosed herein may maintain and leverage a client-side fingerprint cache associated with a previous storage of a data selection to the single-instance-storage computing subsystem to initialize a new client-side fingerprint cache for use in data deduplication associated with a request to store the data selection to the single-instance-storage computing subsystem. As used herein, "data deduplication" may refer to one or more operations related to reducing the amount of storage space used in a single-instance data storage system, including operations for detecting and preventing data from being redundantly stored to the single-instance data storage system. A "fingerprint cache" may include a data set including one or more fingerprints descriptive of at least a portion of data stored in the single-instance data storage system.

The following will provide, with reference to FIGS. 1-3 and 10, detailed descriptions of exemplary systems for data deduplication, particularly controlling initialization of a fingerprint cache for data deduplication. Detailed descriptions of corresponding computer-implemented methods of data deduplication and of controlling initialization of a fingerprint cache for data deduplication will be provided in connection with FIGS. 4-9. In addition, detailed descriptions of an exemplary computing system and network architecture capable of implementing one or more of the embodiments described herein will be provided in connection with FIGS. 11 and 12, respectively.

FIG. 1 is a block diagram of an exemplary system 100 for data deduplication. As illustrated in this figure, exemplary system 100 may comprise a client-side data deduplication computing subsystem 102 ("data deduplication computing subsystem 102" or simply "data deduplication subsystem 102") in communication with a server-side single-instance-storage (SIS) computing subsystem 104 ("SIS computing subsystem 104" or simply "SIS subsystem 104"). In at least one embodiment, and as will be described in greater detail below, data deduplication computing subsystem 102 may include a deduplication client 108, cache memory 110, and storage device 112 storing local data 114 (also referred to as "client-side data 114"), a client-side fingerprint cache 116 (or simply "fingerprint cache 116"), and client-side storage event data 118. In addition, SIS computing subsystem 104 may include a deduplication server 120, cache memory 121, and storage device 122 including a single-instance-storage (SIS) data store 124, fingerprint data 126, and server-side storage event data 128.

SIS computing subsystem 104, or one or more components of SIS computing subsystem 104, may include or be implemented as hardware, computing instructions (e.g., software) embodied on at least one computer-readable medium, or a combination thereof. In one embodiment, for example, SIS computing subsystem 104, or one or more components of SIS computing subsystem 104, may include or be implemented on one or more server devices configured to communicate over a network.

Data deduplication computing subsystem 102, or one or more components of data deduplication computing subsystem 102, may include or be implemented as hardware, computing instructions (e.g., software) embodied on at least one computer-readable medium, or a combination thereof. In one embodiment, for example, data deduplication computing subsystem 102, or one or more components of data deduplication computing subsystem 102, may include or be implemented on one or more client computing devices configured to communicate over a network.

Data deduplication computing subsystem 102 and SIS computing subsystem 104 may communicate with one another using any suitable data communication protocols, media, and technologies. In at least one embodiment, data deduplication computing subsystem 102 and SIS computing subsystem 104 may communicate directly with one another. In at least one other embodiment, data deduplication computing subsystem 102 and SIS computing subsystem 104 may communicate with one another indirectly, such as via a network.

Figure 2:
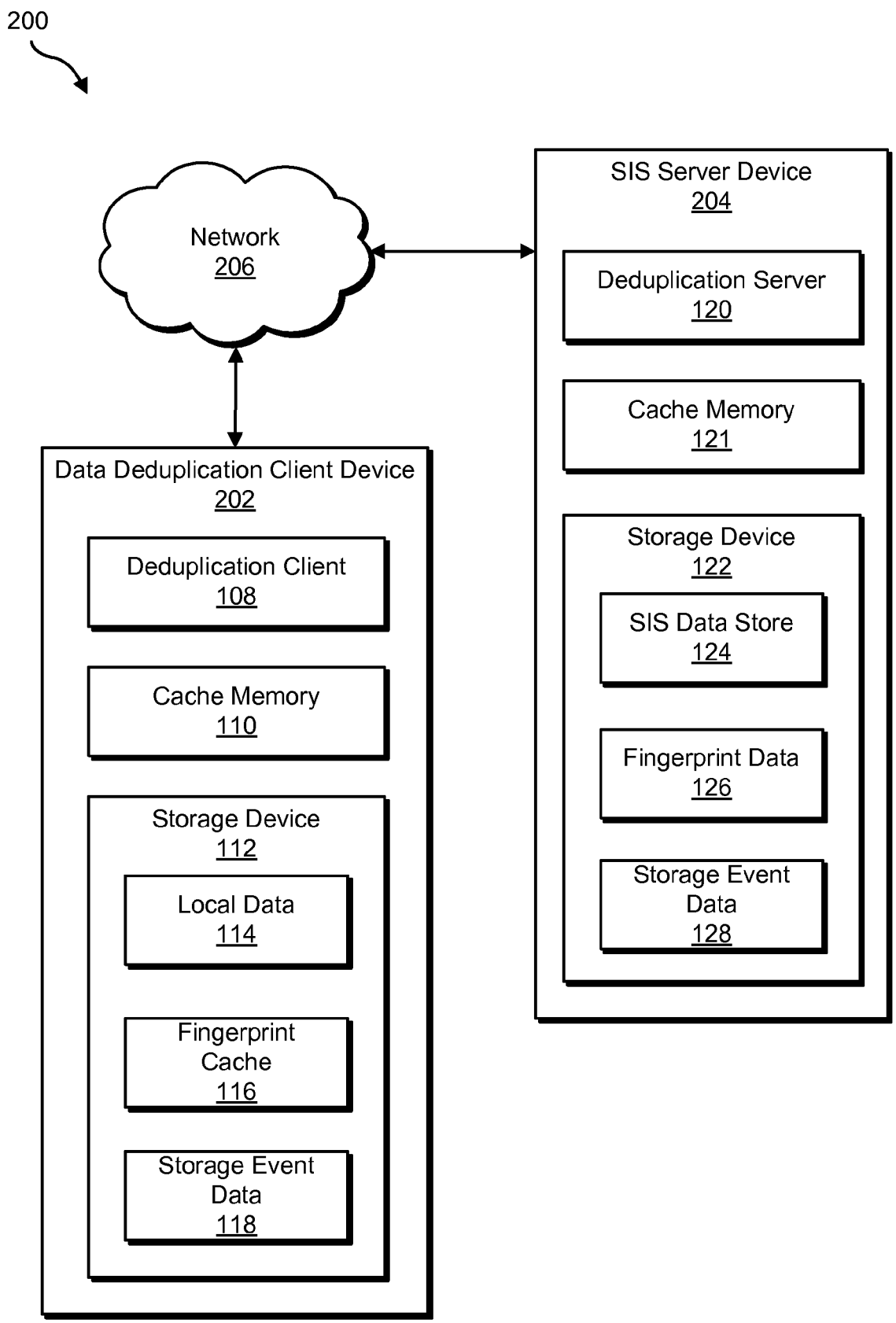
FIG. 2 is a block diagram of an exemplary implementation of the system of FIG. 1 according to at least one embodiment.

FIG. 2 is a block diagram of an exemplary implementation 200 of exemplary system 100. As illustrated in this figure, data deduplication computing subsystem 102 may include or be implemented on a data deduplication client device 202. In addition, SIS computing subsystem 104 may include or be implemented on a single-instance-storage (SIS) server device 204. Data deduplication client device 202 and SIS server device 204 may be in communication with one another via a network 206.

Network 206 generally represents any medium or architecture capable of facilitating communication or data transfer. Examples of network 206 include, without limitation, an intranet, a wide area network (WAN), a local area network (LAN), a personal area network (PAN), the Internet, power line communications (PLC), a cellular network (e.g., a GSM network), exemplary network architecture 1200 in FIG. 12, or the like. Network 206 may facilitate communication or data transfer between data deduplication client device 202 and SIS server device 204.

SIS server device 204 may include any type or form of server-side computing device capable of reading computer-executable instructions and performing one or more of the server-assisted deduplication operations and/or single-instance data storage operations described herein. Examples of SIS server device 204 include, without limitation, laptops, desktops, servers, combinations of one or more of the same, exemplary computing system 1110 in FIG. 11, or any other suitable computing device configured to perform one or more of the server-assisted deduplication operations and/or single-instance data storage operations described herein.

Data deduplication client device 202 may include any type or form of client-side computing device capable of reading computer-executable instructions and performing one or more of the client-side data deduplication operations described herein. Examples of data deduplication client device 202 include, without limitation, laptops, desktops, cellular phones, personal digital assistants (PDAs), multimedia players, embedded systems, combinations of one or more of the same, exemplary computing system 1110 in FIG. 11, or any other suitable computing device configured to perform one or more of the data deduplication operations described herein.

Returning to FIG. 1, components of data deduplication computing subsystem 102 and SIS computing subsystem 104 will now be described in more detail. As mentioned above, SIS computing subsystem 104 may include storage device 122, which generally represents any type or form of data storage device and/or medium (e.g., a computer-readable-storage medium), such as the storage devices illustrated and described in connection with FIGS. 11 and 12. Storage device 122 may include SIS data store 124, which may comprise one or more collections of single-instance data, such as a single-instance database, for example. As used herein, "single-instance data" generally refers to non-duplicative data. Hence, SIS data store 124 may be configured to store only non-redundant instances of data.

SIS computing subsystem 104 may be configured to generate, update, delete, and otherwise maintain fingerprint data 126 in storage device 122. The fingerprint data 126 may include one or more fingerprints associated with instances of data stored in SIS data store 124. Each fingerprint may comprise a signature or other identifier corresponding to and useful for identifying a particular instance of data stored in SIS data store 124. SIS computing subsystem 104 may generate and add the fingerprints to the fingerprint data 126 in conjunction with storage of the corresponding data instances to the SIS data store 124. SIS computing subsystem 104 may update the fingerprint data 126 by, for example, adding and/or deleting fingerprints in conjunction with storage and/or deletion of corresponding data instances in the SIS data store 124 such that the fingerprint data 126 includes fingerprints that provide an up-to-date representation of data segments stored in SIS data store 124. SIS computing subsystem 104 may generate fingerprints representative of data instances in any suitable way, including, without limitation, by using a hash, checksum, or fingerprint-generation heuristic.

Figure 3:
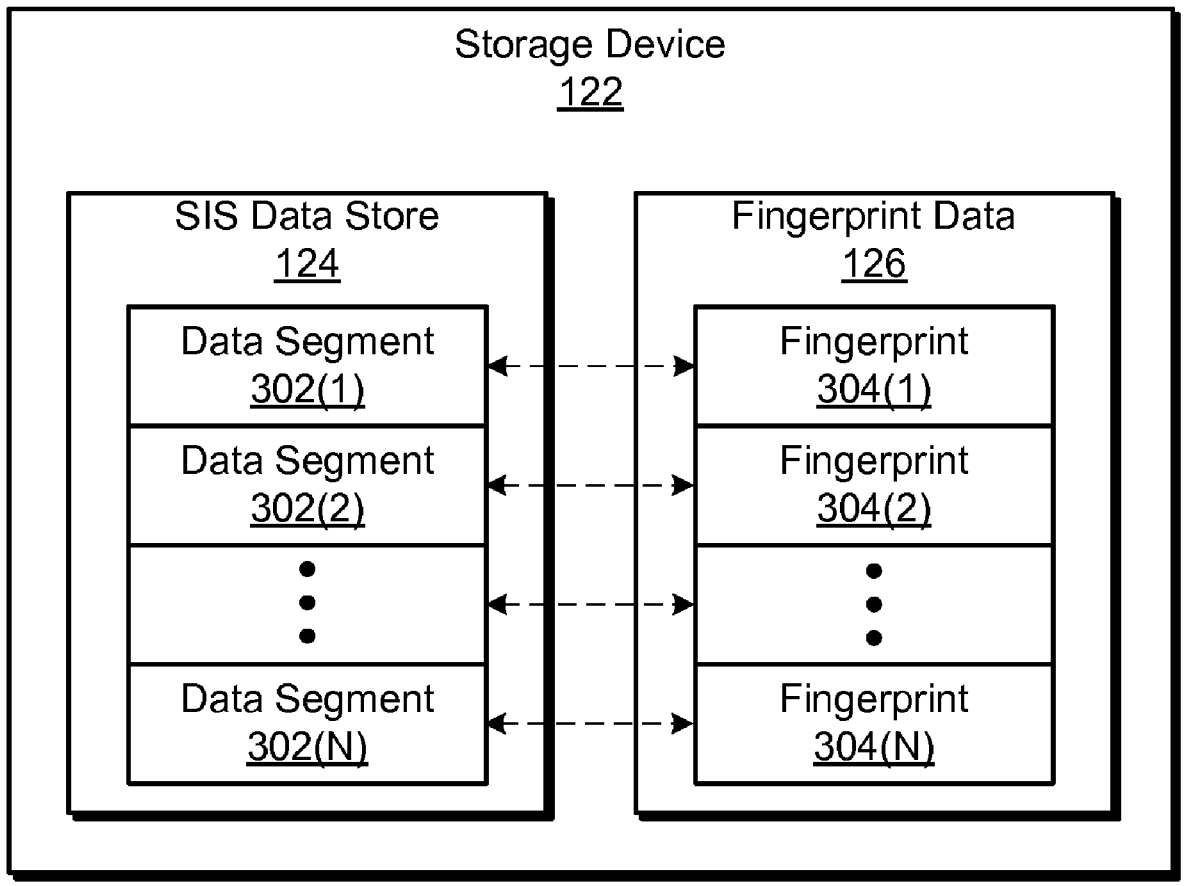
FIG. 3 is a block diagram of exemplary data segments stored to a single-instance-storage data store according to at least one embodiment.

FIG. 3 is a block diagram illustrating exemplary data segments 302 (e.g., data segments 302(1) through 302(N)) stored in SIS data store 124 and fingerprints 304 (e.g., fingerprints 304(1) through 304(N)) included in the fingerprint data 126 and corresponding to the data segments 302. A data segment 302 may generally represent any type or form of a discrete instance of data, such as a data cluster. In conjunction with SIS computing subsystem 104 storing a data segment (e.g., data segment 302(1)) to SIS data store 124, SIS computing subsystem 104 may generate and add a corresponding fingerprint (e.g., fingerprint 304(1)) in the fingerprint data 126. Thereafter, in conjunction with subsequent requests to store data to the SIS data store 124, SIS computing subsystem 104 may use the fingerprint and any other fingerprints in the fingerprint data 126 for server-assisted deduplication, including determining whether data segments in the data are already stored in the SIS data store 124.

A data selection may include a plurality of data segments. The data segments may be grouped into one or more sets that may be referred to as "file instances." Thus, a data selection may include one or more file instances having one or more data segments associated therewith. A "file instance," as used herein, may include any grouping of related data segments and/or fingerprints associated with the data segments. The data segments and/or segment fingerprints may be related in any suitable way. As an example, a "file" may include a plurality of data segments and/or segment fingerprints that are related by their common associated with the file. This is illustrative only. A file instance may include other grouping of related data segments and/or segment fingerprints.

SIS computing subsystem 104 may be further configured to generate, update, delete, and otherwise maintain storage event data 128 in storage device 122. Storage event data 128 may include any information descriptive of one or more storage events. As used herein, a "storage event" may include any storage of a data selection to SIS data store 124. For example, a storage event may include a backup of a data selection to SIS data store 124. Examples of information that may be included in the storage event data 128 may include, without limitation, storage event identifiers, data selection identifiers, storage status information (e.g., information indicating whether storage of a data selection is "valid" as described further below), information descriptive of the data stored to SIS data store 124 (e.g., file metadata such as file names, file sizes, and creation, modification, and deletion timestamps for one or more file instances included in a data selection). In certain embodiments, storage event data 128 may include information descriptive of a snapshot of a most recent storage event, or of a number of previous storage events, for a data selection. Accordingly, storage event data 128 may provide an accurate description of one or more previous storage events for a data selection, including, for example, an accurate description of the most recent previous storage of a data selection, to SIS data store 124 and of the contents of SIS data store 124.

Figure 4:
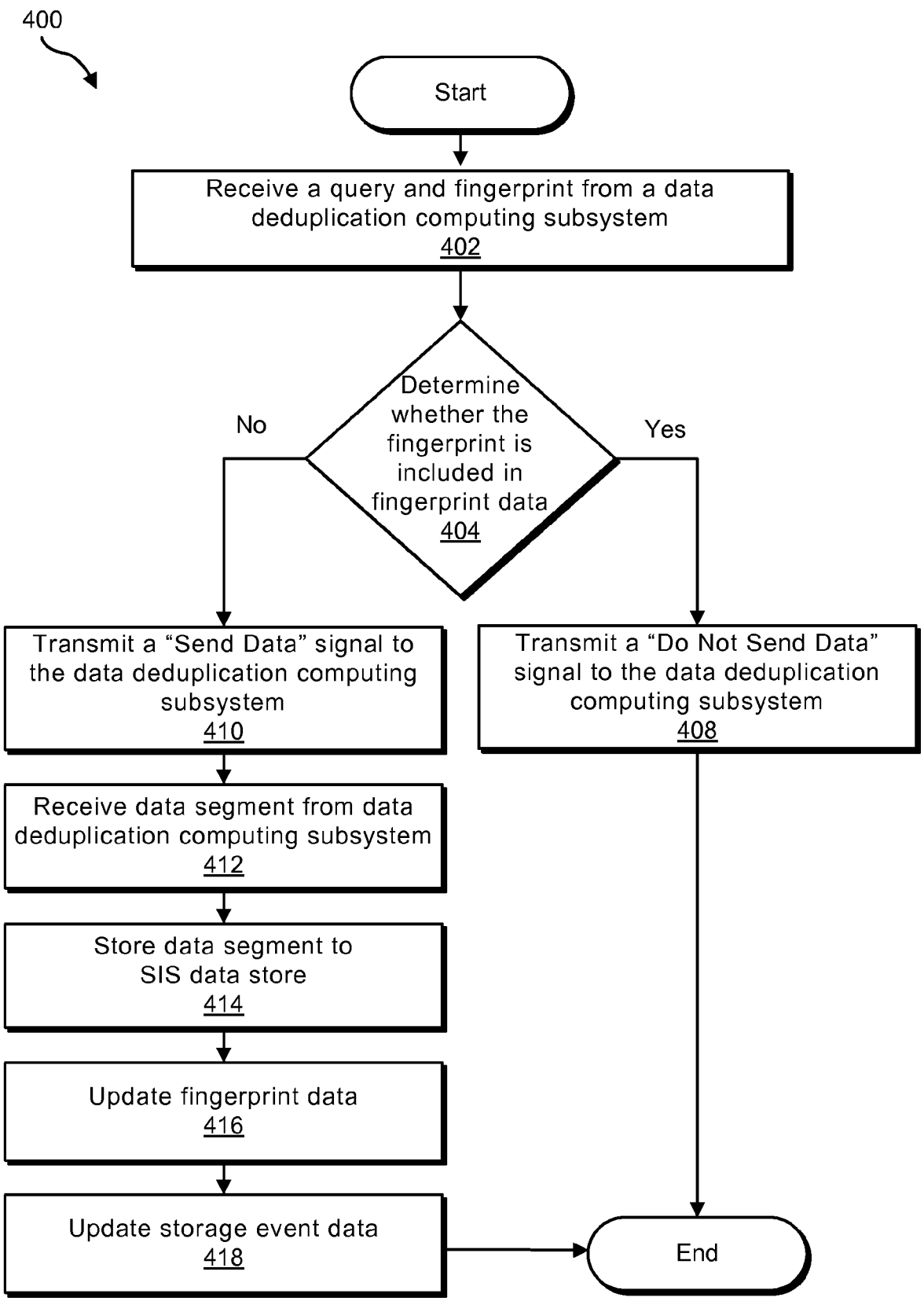
FIG. 4 is a flow diagram of an exemplary server-assisted deduplication method according to at least one embodiment.

FIG. 4 is a flow diagram of an exemplary server-assisted deduplication method 400. While FIG. 4 illustrates exemplary steps according to one embodiment, other embodiments may omit, add to, reorder, and/or modify any of the steps shown in FIG. 4.

As illustrated in FIG. 4, at step 402 a query and fingerprint may be received from a data deduplication computing subsystem. For example, SIS computing subsystem 104 may receive data representative of the query and fingerprint from data deduplication computing subsystem 102 (e.g., over network 206). The fingerprint may correspond to a data segment, and the query may represent a request to use the fingerprint to determine whether the data segment is already included in SIS data store 124.

At step 404, a determination may be made as to whether the fingerprint is included in the fingerprint data 126. For example, SIS computing subsystem 104 may determine whether the fingerprint is included in the fingerprint data 126, such as by searching the fingerprint data 126 for a fingerprint matching the fingerprint received in step 402.

If the fingerprint is determined to be in the fingerprint data 126 at step 404, a "Do Not Send Data" signal may be transmitted to the data deduplication computing subsystem 102 at step 408. For example, in response to this determination, SIS computing subsystem 104 may automatically transmit the "Do Not Send Data" signal to the data deduplication computing subsystem 102. In response, data deduplication computing subsystem 102 will not send, and SIS computing subsystem 104 will not receive or store to the SIS data store 124, a duplicate copy of the data segment corresponding to the fingerprint. The method 400 may then end, and may be repeated for another query and fingerprint corresponding to another data segment.

On the other hand, if the fingerprint is determined not to be in the fingerprint data 126 at step 404, a "Send Data" signal may be transmitted to the data deduplication computing subsystem 102 at step 410. For example, in response to this determination, SIS computing subsystem 104 may automatically transmit the "Send Data" signal to the data deduplication computing subsystem 102. In response, data deduplication computing subsystem 102 may send the data segment corresponding to the fingerprint to the SIS subsystem 104 for storage in SIS data store 124.

At step 412, the data segment may be received from the data deduplication computing subsystem 102. For example, SIS subsystem 104 may receive the data segment (e.g., via network 206).

At step 414, the data segment may be stored to the SIS data store 124. For example, SIS computing subsystem 104 may store the data segment to the SIS data store 124.

At step 416, the fingerprint data 126 may be updated. For example, SIS computing subsystem 104 may update the fingerprint data 126 to include the fingerprint corresponding to the data segment stored to the SIS data store 124 at step 414.

At step 418, the storage event data 128 may be updated. For example, SIS computing subsystem 104 may update the storage event data 128 to include information descriptive of the data segment and/or the fingerprint corresponding to the data segment stored to the SIS data store 124 at step 414. For example, the storage event data 128 may be updated to include file information about a file instance of which the data segment is a part. Storage event data 128 may be updated granularly per data segment as shown in FIG. 4. Additionally or alternatively, storage event data 128 may be updated at a higher level such as per file instance and/or data selection. After step 418, the method 400 may end, and may be repeated for another query and fingerprint corresponding to another data segment.

Alternative or in addition to server-assisted deduplication operations performed by SIS computing subsystem 104, data deduplication computing subsystem 102 may perform client-side data deduplication operations related to requests to store data to SIS data store 124. In at least one embodiment, one or more of the steps shown in FIG. 4 may be performed in conjunction with one or more client-side data deduplication operations. For example, SIS computing subsystem 104 may perform one or more of the steps of FIG. 4 to verify determinations made by client-side data deduplication operations. As another example, SIS computing subsystem 104 may perform one or more steps of FIG. 4 when data deduplication computing subsystem 102 lacks information to make data deduplication determinations.

Performance of client-side data deduplication operations may help conserve server-side and/or network bandwidth resources. For example, client-side data deduplication operations may reduce both the number of queries and fingerprints that are transmitted from data deduplication computing subsystem 102 to SIS computing subsystem 104 and the number of fingerprint comparisons performed by SIS computing subsystem 104.

Returning to SIS computing subsystem 104, SIS computing subsystem 104 may be configured to update fingerprint data 126 and storage event data 128 such that the fingerprint data 126 and storage event data 128 provide an up-to-date representation of data stored in SIS data store 124. Accordingly, SIS computing subsystem 104 may add, modify, and delete fingerprint data 126 and storage event data 128 to reflect the current data and/or status of data in SIS data store 124. Updates to fingerprint data 126 and storage event date 128 may be performed in response to any change made to data in SIS data store 124, including additions, modifications, and deletions of data in SIS data store 124.

As an example, SIS computing subsystem 104 may be configured to delete outdated data from SIS data store 124. For instance, SIS computing subsystem 104 may store (e.g., backup) a data selection to SIS data store 124. The data selection may then be locally modified (e.g., by data deduplication computing subsystem 102) such as by deletion of a file instance from the data selection in local data 114. After this modification to the data selection, the modified data selection may be stored to SIS data store 124. SIS computing subsystem 104 may detect the deletion of the file instance from the data selection in local data 114 and may initiate a data deletion process to delete the outdated file instance from SIS data store 124. SIS computing subsystem 104 may also delete one or more fingerprints associated with the deleted file instance from the fingerprint data 126 and any information associated with the file instance from the storage event data 128 such that the fingerprint data 126 and the storage event data 128 may continue to provide an up-to-date representation of data stored in SIS data store 124.

In this or a similar manner, SIS computing subsystem 104 may maintain single-instance data representative of a most recent previous storage and/or multiple previous storages of a data selection to SIS data store 124, as well as up-to-date fingerprint data 126 and storage event data 128 descriptive of the most recent previous storage or multiple previous storages of the data selection to SIS data store 124. Accordingly, the fingerprint data 126 and storage event data 128 may be used for accurate comparisons of data for future data deduplication operations.

One or more of the server-side operations described herein, including one or more of the steps shown in FIG. 4, may be performed by one or more components of SIS computing subsystem 104, such as by deduplication server 120 executing one or more or the operations and/or directing one or more other components of SIS computing subsystem 104 to execute one or more of the operations. Deduplication server 120 may include or be implemented as hardware, computing instructions (e.g., software) embodied on at least one computer-readable medium, or a combination thereof. In at least one embodiment, for example, duplication server 120 may include a software application tangibly embodied on a computer-readable-storage medium (e.g., storage device 122) and configured to direct SIS computing subsystem 104 to perform one or more of the server-side operations described herein.

In some examples, fingerprint data 126 may be loaded into cache memory 121 for access by duplication server 120 to search for and compare fingerprints in the fingerprint data, as described above. Similarly, storage event data 128 may be loaded into cache memory 121 for processing. Cache memory 121 may represent any temporary computing memory.

The above description has been related primarily to SIS computing subsystem 104, server-side data, and server-assisted deduplication operations. Exemplary client-side data deduplication operations will now be described with reference to exemplary components of data deduplication computing subsystem 102.

Returning to FIG. 1, data deduplication computing subsystem 102 may include storage device 112, which generally represents any type or form of data storage device and/or medium (e.g., a computer-readable-storage medium), such as the storage devices illustrated and described in connection with FIGS. 11 and 12. As mentioned, storage device 112 may include local data 114, which may include any data stored on storage device 112, including data that may be generated and/or consumed by a user of data deduplication computing subsystem 102. For example, local data 114 may include data files, media files, and executable files, such as those used to implement software applications and operating systems, as well as files that are used or generated by such executable files, including files generated by user applications (e.g., word processing programs, email programs, graphics programs, database applications, or the like) executing on data deduplication computing subsystem 102. As another example, local data 114 may include data in a registry and/or file system of a computing device.

One or more selections of data in the local data 114 may be marked for storage (e.g., backup) to SIS data store 124 of SIS computing subsystem 104. A data selection may comprise a logical data set (e.g., a logical set of files and/or directories) marked for storage to SIS data store 124 of SIS computing subsystem 104. As used herein, "marked for storage" may refer to current and/or scheduled future events for storage of a data selection to SIS data store 124. For instance, a user may mark a data selection for current backup and/or scheduled future backup. Scheduled backup may include a one-time backup of a data selection scheduled at a future date and/or a schedule of recurring periodic backups of a data selection. A request to store a data selection to SIS computing subsystem 104 may be initiated by a user of data deduplication computing subsystem 102 marking the data selection for storage (e.g., backup) to SIS computing subsystem 104 or by initiation of a scheduled storage event. An initiation of a request to store a data selection to SIS computing subsystem 104 may launch one or more client-side data deduplication operations.

Storage of a data selection included in local data 114 to SIS computing subsystem 104 is illustrative only. One or more of the deduplication operations described herein may be similarly performed for storage of data selections from other sources to SIS computing subsystem 104. For example, a data selection (e.g., a stream of data) may be pushed from an external source (e.g., from an external device, which may include a third-party device) to data deduplication computing subsystem 102 (e.g., over network 206) for deduplication and storage to SIS data store 124. As another example, data deduplication computing subsystem 102 may generate and provide a data selection (e.g., a data stream and/or a log file) for deduplication and storage to SIS data store 124 without the data selection first being stored in storage device 112, such that the data selection does not originate from the storage device 112.

Data deduplication computing subsystem 102 may be configured to maintain client-side fingerprint cache 116 in storage device 112. Fingerprint cache 116 may represent a collection of one or more fingerprints associated with a data selection, such as a data selection stored or marked for storage to SIS data store 124. Fingerprint cache 116 may represent one or more versions of a collection of fingerprints, including versions of the collection of fingerprints before, during, and/or after performance of one or more data deduplication operations. As an example, fingerprint cache 116 may represent a collection of fingerprints associated with a previous storage event (e.g., a most recent previous backup) or multiple previous storages events (e.g., multiple previous backups) of a data selection to SIS data store 124. As another example, fingerprint cache 116 may represent a newly initialized collection of fingerprints for use in client-side data deduplication for storage of a data selection to SIS data store 124. Fingerprint cache 116 may represent a collection of fingerprints stored in storage device 112 and/or loaded in cache memory 110.

In some examples, client-side fingerprint cache 116 may include fingerprints for data segments, as well as for file instances of which the data segments are a part. For example, each entry in fingerprint cache 116 may include a data segment fingerprint and a corresponding file-instance fingerprint. Accordingly, data in fingerprint cache 116 may be used by data deduplication computing subsystem 102 to identify associations between file instances and data segments of a data selection.

Data deduplication computing subsystem 102 may be further configured to maintain server-side storage event data 118 in storage device 112. The storage event data 118 may include any information descriptive of one or more storage events (e.g., backups) of data selections to SIS data store 124. Examples of information that may be included in the storage event data 118 may include, without limitation, storage event identifiers, data selection identifiers, information descriptive of the data stored to SIS data store 124 (e.g., file metadata such as file names, file sizes, and creation, modification, and deletion timestamps for one or more file instances included in a data selection). In certain embodiments, storage event data 118 may include information descriptive of a snapshot of a most recent storage event for a data selection, such as a list of file-instance identifiers indicating file instances included in the data selection stored to SIS data store 124. Accordingly, storage event data 118 may provide an accurate description of the most recent previous storage of a data selection to SIS data store 124 and of the contents of SIS data store 124.

As will be described in greater detail further below, data deduplication computing subsystem 102 may be configured to update fingerprint cache 116 and storage event data 128 to account for updates and/or possible updates to data stored in SIS data store 124. Such updates may allow fingerprint cache 116 to be accurately leveraged for subsequent client-side data deduplication operations, as described below, without having to perform a full initialization or re-initialization of fingerprint cache 116 for each subsequent request to store a data selection to SIS data store 124.

Figure 5:
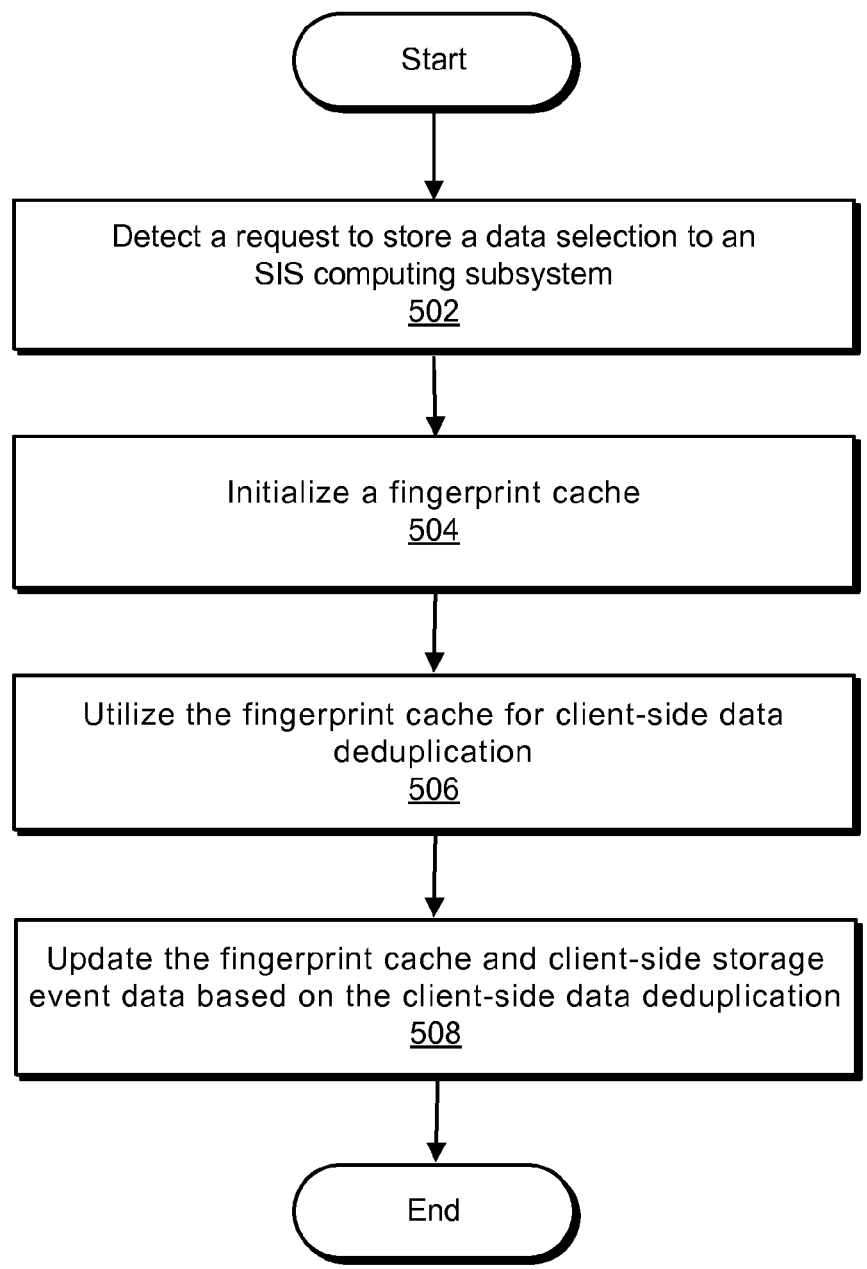
FIG. 5 is a flow diagram of an exemplary method for controlling initialization of a fingerprint cache for data deduplication according to at least one embodiment.

FIG. 5 is a flow diagram of an exemplary client-side data deduplication method 500. While FIG. 5 illustrates exemplary steps according to one embodiment, other embodiments may omit, add to, reorder, and/or modify any of the steps shown in FIG. 5.

As illustrated in FIG. 5, at step 502 a request to store a data selection to an SIS computing subsystem may be detected. For example, data deduplication computing subsystem 102 may detect the request to store the data selection to SIS computing subsystem 104. Data deduplication computing subsystem 102 may detect the request in any suitable way, including by detecting a predefined event, which may include receipt of user input identifying the data selection and/or requesting that the data selection be stored (e.g., backed up) to SIS computing subsystem 104 or initialization of a scheduled data storage event (e.g., a recurring data backup) at a predetermined time.

At step 504, a fingerprint cache may be initialized. For example, data deduplication computing subsystem 102 may initialize a fingerprint cache (e.g., fingerprint cache 116) for use in one or more client-side data deduplication operations. Data deduplication computing subsystem 102 may be configured to initialize a fingerprint cache in various ways, including by selectively leveraging a previous version of a client-side fingerprint cache associated with a previous storage of the data selection to SIS computing subsystem 104. Examples of initializing a fingerprint cache will be described in detail further below.

At step 506, the fingerprint cache initialized at step 504 may be utilized for client-side data deduplication. An example of utilization of the fingerprint cache initialized at step 504 for client-side data deduplication will be described further below in reference to FIG. 6.

At step 508, the fingerprint cache initialized at step 504 and the client-side storage event data may be updated based on the client-side data deduplication at step 506. For example, data deduplication computing subsystem 102 may update fingerprint cache 116 and storage event data 118. The update may include any addition, modification, and/or deletion configured to update fingerprint cache 116 and storage event data 118 to reflect storage of the data selection to SIS data store 124 related to the data deduplication at step 506. Upon completion of step 508, exemplary method 500 in FIG. 5 may terminate, and may be repeated for another request to store a data selection to SIS computing subsystem 104.

As described further below, step 508 may be included in some methods of controlling initialization of a client-side fingerprint cache 116 and omitted from other methods of controlling initialization of a client-side fingerprint cache 116. Examples of updates that may be performed at step 508 will be described further below.

Figure 6:
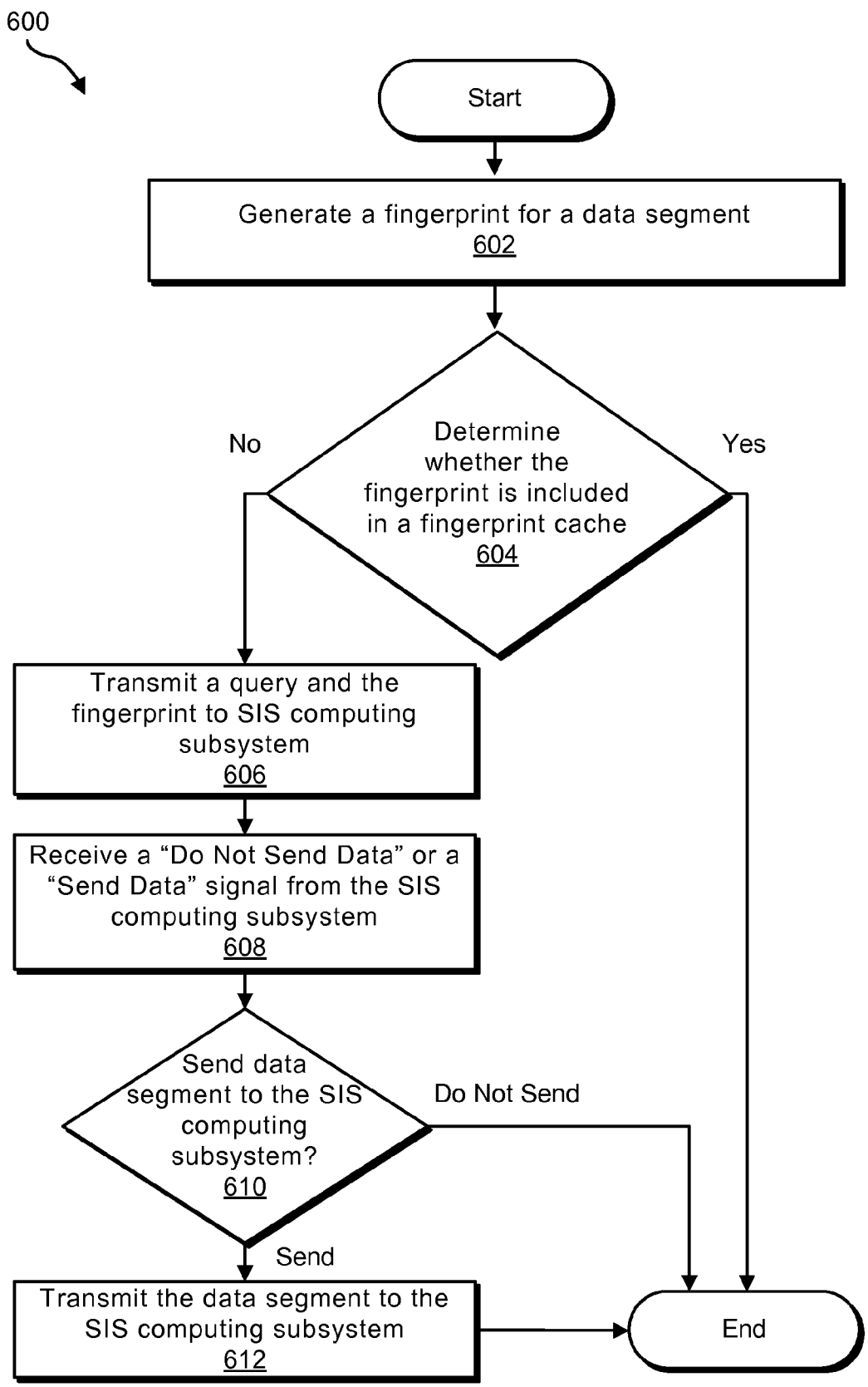
FIG. 6 is a flow diagram of an exemplary method for client-side data deduplication according to at least one embodiment.

As mentioned, at step 506 of FIG. 5 the fingerprint cache initialized at step 504 may be utilized for client-side data deduplication. FIG. 6 illustrates an exemplary method 600 of client-side data deduplication according to at least one embodiment. While FIG. 6 illustrates exemplary steps according to one embodiment, other embodiments may omit, add to, reorder, and/or modify any of the steps shown in FIG. 6.

As illustrated in FIG. 6, at step 602 a fingerprint for a data segment in a data selection may be generated. For example, data deduplication computing subsystem 102 may calculate the fingerprint in any of the ways mentioned herein (e.g., in accordance with a checksum, hash, or fingerprint-generation heuristic). The data selection may comprise a logical set of local data 114 marked for storage to SIS data store 124, as described above.

At step 604, a determination may be made as to whether the fingerprint generated in step 602 is included in a fingerprint cache. For example, data deduplication computing subsystem 102 may determine whether the fingerprint is included in the client-side fingerprint cache initialized in step 504 of FIG. 5.

If the fingerprint is determined to be in the fingerprint cache at step 604, the method 600 may end, and may be repeated for another data segment in the data selection. This determination may indicate that the data segment associated with the fingerprint is already stored in SIS data store 124. Accordingly, data deduplication computing subsystem 102 may not send the data segment, a query, or a fingerprint associated with the data segment to SIS computing subsystem 104. This may help reduce traffic between data deduplication computing subsystem 102 and SIS computing subsystem 104, which may help reduce demands on network bandwidth and/or processing demands at the SIS computing subsystem 104.

On the other hand, if the fingerprint is determined not to be in the fingerprint cache at step 604, at step 606 a query and the fingerprint may be transmitted to SIS computing subsystem 104. For example, data deduplication computing subsystem 102 may transmit the query and fingerprint to SIS computing subsystem 104, which may be configured to perform server-assisted deduplication based on the query and the fingerprint as described above in reference to FIG. 4, which may include transmitting a "Do Not Send Data" or a "Send Data" signal to data deduplication computing subsystem 102 based on whether SIS computing subsystem 104 determines that the data segment associated with the fingerprint is already stored in SIS data store 124.

At step 608, a "Do Not Send Data" or a "Send Data" signal may be received from the SIS computing subsystem 104. For example, data deduplication computing subsystem 102 may receive a "Do Not Send Data" or a "Send Data" signal from the SIS computing subsystem 104.

At step 610, a determination may be made as to whether to send the data segment to the SIS computing subsystem 104. For example, data deduplication computing subsystem 102 may determine whether to send the data segment to the SIS computing subsystem 104 based on the signal received from the SIS computing subsystem 104 in step 608.

If the determination at step 610 is to not send the data segment to SIS computing subsystem 104, the method 600 may end, and may be repeated for another data segment in the data selection. This determination may indicate that the SIS computing subsystem 104 has determined that the data segment associated with the fingerprint is already stored in SIS data store 124. Accordingly, data deduplication computing subsystem 102 may not send the data segment to the SIS computing subsystem 104. This may help reduce traffic between data deduplication computing subsystem 102 and SIS computing subsystem 104, which may help reduce demands on network bandwidth and/or processing demands at the SIS computing subsystem 104.

On the other hand, if the determination at step 610 is to send the data segment to SIS computing subsystem 104, the data segment may be transmitted to the SIS computing subsystem 104 at step 612. For example, data deduplication computing subsystem 102 may transmit the data segment to the SIS computing subsystem 104 (e.g., via network 206). The method 600 may then end, and may be repeated for another data segment in the data selection.

In this or a similar manner, the fingerprint cache initialized at step 504 of FIG. 5 may be utilized for data deduplication related to storage of a data selection to SIS computing subsystem 104. Examples of initializing a fingerprint cache at step 504 of FIG. 5 will now be described.

Figure 7:
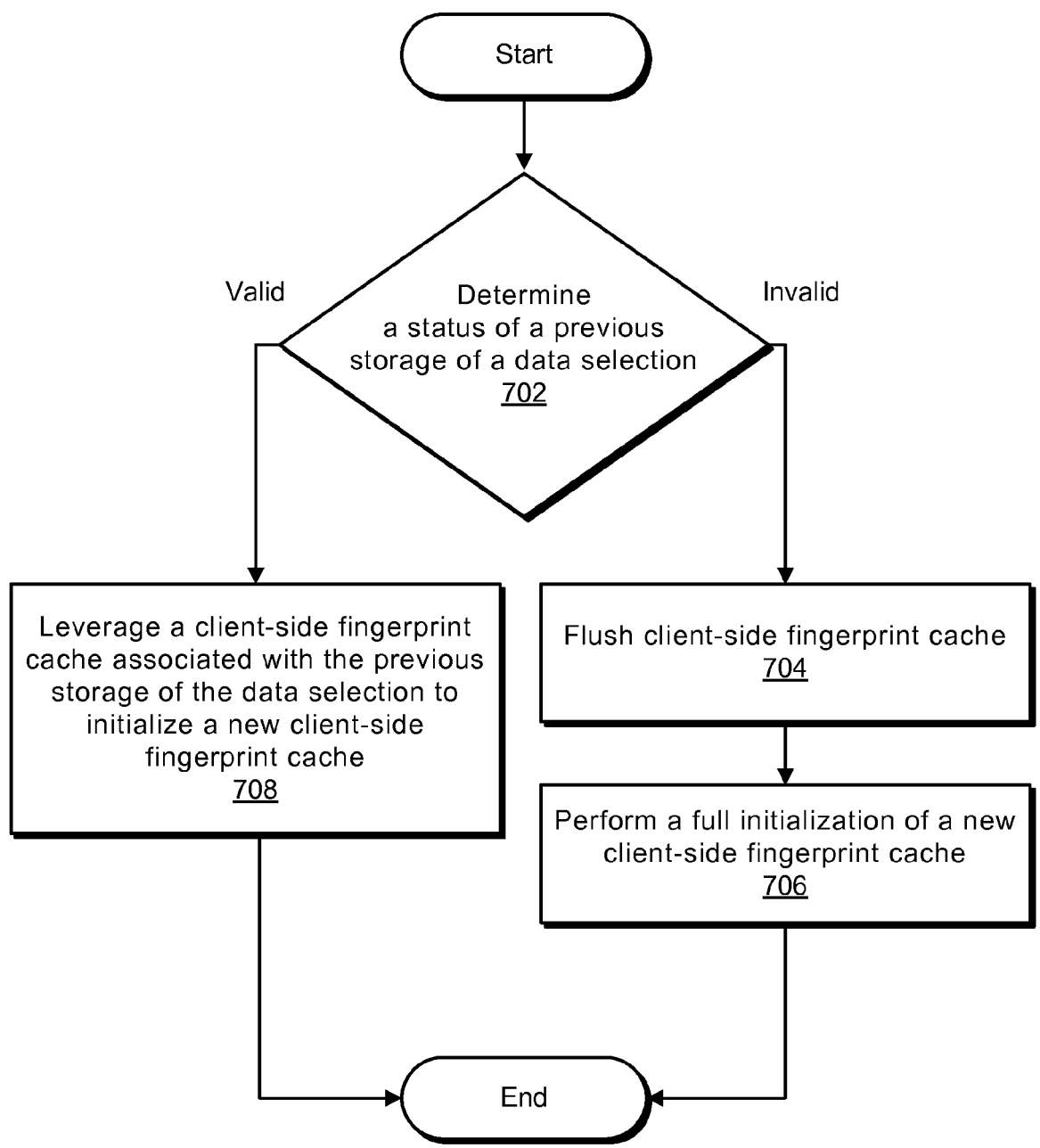
FIG. 7 is a flow diagram of an exemplary method for controlling initialization of a fingerprint cache for data deduplication according to at least one embodiment.

FIG. 7 illustrates an exemplary method 700 of controlling initialization of a fingerprint cache for use in client-side data deduplication, according to at least one embodiment. In at least one embodiment, method 700 may be performed as part of step 504 of FIG. 5. While FIG. 7 illustrates exemplary steps according to one embodiment, other embodiments may omit, add to, reorder, and/or modify any of the steps shown in FIG. 7.

As illustrated in FIG. 7, at step 702 a status of a previous storage of a data selection may be determined. For example, data deduplication computing subsystem 102 may determine a status of a previous storage of a data selection to SIS computing subsystem 104. The determination may be made in any suitable manner. In at least one embodiment, data deduplication computing subsystem 102 may send a data-selection-status request to SIS computing subsystem 104, which may access storage event data 128 to identify a status of the data selection. SIS computing subsystem 104 may transmit data representative of the status of the data selection to data deduplication computing subsystem 102 in a data-selection-status response. Based on the data-selection-status response, data deduplication computing subsystem 102 may determine the status of data selection.

In some examples, a status of a data selection may indicate whether a previous storage of the data selection to SIS data store 124 is reliable for use in client-side data deduplication operations. When the previous storage of the data selection to SIS data store 124 is reliable, SIS computing subsystem 104 may set the status of the data selection to "valid." Conversely, when the previous storage of the data selection to SIS data store 124 is unreliable, SIS computing subsystem 104 may set the status of the data selection to "invalid." The status may be stored in storage event data 128.

As used herein, a "valid" status associated with a data selection may refer to the previous storage of the data selection being an accurate representation of the data selection as currently stored in SIS data store 124. When a data selection is successfully stored to SIS data store, SIS computing subsystem 104 may set the status of the data selection to "valid," which in some examples may mean that SIS computing subsystem 104 guarantees that the storage of the data selection is reliable and will be reliable throughout a next storage event. On the other hand, SIS computing subsystem 104 may set the status of the data selection to "invalid" in response to a failure to successfully store the data selection to SIS data store 124 or in response to a removal of at least a subset of the data selection from SIS data store 124 (e.g., due to a server-side data removal process).

If the status of the data selection is determined to be "invalid" at step 702, at step 704 a client-side fingerprint cache may be flushed. For example, data deduplication computing subsystem 102 may flush (e.g., delete) fingerprint cache 116. This may help ensure that a potentially unreliable fingerprint cache 116 associated with a previous storage of a data selection is not used for data deduplication associated with a subsequent request to store the data selection to SIS data store 124. The fingerprint cache may be flushed in any suitable way.

At step 706, a full initialization of a new client-side fingerprint cache may be performed. For example, data deduplication computing subsystem 102 may perform a full initialization of a new fingerprint cache 116. This may include data deduplication computing subsystem 102 requesting and retrieving up-to-date fingerprint data 126 associated with the data selection from SIS computing subsystem 104. Accordingly, data deduplication computing subsystem 102 may transmit one or more queries for the fingerprint data 126 to SIS computing subsystem 104, which may receive and process the requests to send the requested up-to-date fingerprint data 126 to data deduplication computing subsystem 102. Data deduplication computing subsystem 102 may use the fingerprint data 126 received from SIS computing subsystem 104 to initialize a new fingerprint cache 116 that may be reliably used for client-side data deduplication related to a request to store the data selection to SIS data store 124.

In at least one embodiment, step 706 may include replacing storage event data 118 with up-to-date information received from SIS computing subsystem 104. For example, data deduplication computing subsystem 102 may flush storage event data 118 and request and receive up-to-date server-side storage event data 128 from SIS computing subsystem 104. The up-to-date storage event data 128 received from SIS computing subsystem 104 may be stored locally by data deduplication computing subsystem 102 at client-side storage event data 118 for use in client-side data deduplication operations and/or leveraged cache initializations. The method 700 may end after step 706.

Returning to step 702, if, on the other hand, the status of the data selection is determined to be "valid," then at step 708 a client-side fingerprint cache associated with the previous storage of the data selection may be leveraged to initialize a new fingerprint cache. For example, data deduplication computing subsystem 102 may leverage a previous version of fingerprint cache 116 to initialize a new version of the fingerprint cache 116 that may be reliably used for client-side data deduplication, without having to perform a full initialization of fingerprint cache 116 as described in relation to step 706. In this or a similar manner, leveraged initialization of a new client-side fingerprint cache may be selectively performed when a client-side fingerprint cache associated with a previous storage of a data selection to SIS computing subsystem 104 is determined to be valid at step 702. Accordingly, full initializations of client-side fingerprint cache 116 may be limited, postponed, avoided, or otherwise controlled, which may help conserve computing and/or network bandwidth resources that would otherwise be used to perform one or more full initializations of a client-side fingerprint cache 116. The method 700 may then end.

Figure 8:
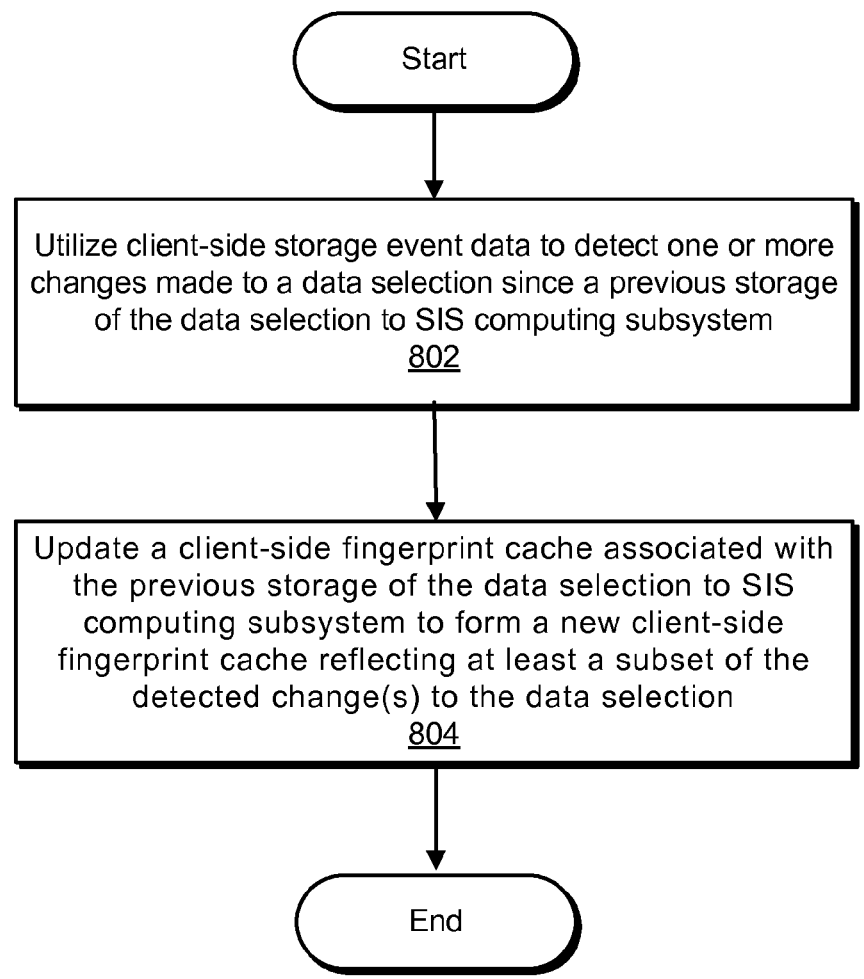
FIG. 8 is a flow diagram of an exemplary method of leveraged initialization of a client-side fingerprint cache according to at least one embodiment.

Examples of leveraging a client-side fingerprint cache to initialize a new client-side fingerprint cache for use in client-side data deduplication will now be described. FIG. 8 illustrates an exemplary method 800 of leveraged initialization of a client-side fingerprint cache. While FIG. 8 illustrates exemplary steps according to one embodiment, other embodiments may omit, add to, reorder, and/or modify any of the steps shown in FIG. 8.

As illustrated in FIG. 8, at step 802 client-side storage event data 118 may be utilized to detect one or more changes made to a data selection since a previous storage of the data selection to SIS computing subsystem 104. For example, data deduplication computing subsystem 102 may utilize storage event data 118 to detect one or more changes made to a data selection since a previous storage of the data selection to SIS computing subsystem 104.

As mentioned above, storage event data 118 may include a snapshot of information associated with a previous storage (e.g., a most recent previous backup) of the data selection to SIS data store 124. When data deduplication computing subsystem 102 detects a request to store the data selection to SIS data store 124, data deduplication computing subsystem 102 may compare information associated with the locally stored data selection (stored in local data 114) to storage event data 118 to detect any changes that have been made to the locally stored data selection since the previous storage of the data selection to SIS data store 124. For example, data deduplication computing subsystem 102 may compare information descriptive of a current version of at least one file instance in the data selection in local data 114 to information in the storage event data 118 that is descriptive of the file instance as stored to SIS data store 124 during a previous storage of the data selection to SIS data store 124. From one or more such comparisons, data deduplication computing subsystem 102 may detect at least one change to the data selection, including deletions from, modifications to, and additions to the data selection (e.g., file-instance deletions, modifications, and additions), that have occurred in the local data 114 since the previous storage of the data selection to SIS data store 124.

At step 804, a client-side fingerprint cache associated with the previous storage of the data selection to SIS computing subsystem 104 may be updated to form a new client-side fingerprint cache reflecting at least a subset of the detected change(s) to the data selection in local data 114. For example, data deduplication computing subsystem 102 may update a client-side fingerprint cache (e.g., a previous version of fingerprint cache 116) associated with a previous storage of the data selection to SIS computing subsystem 104 to form a new client-side fingerprint cache (e.g., a new version of fingerprint cache 116) reflecting at least a subset of the detected change(s) to the data selection.

In some examples, step 804 may include data deduplication computing subsystem 102 removing fingerprints associated with data segments of at least one deleted file instance (e.g., fingerprints associated with a file deleted from the data selection in local data 114) from a previous version of fingerprint cache 116 to form a new version of fingerprint cache 116. This may help ensure that fingerprints associated with a deleted file are not mistakenly relied upon by client-side data deduplication in view of SIS computing subsystem 104 possibly removing the deleted file from SIS data store 124 as part of data deduplication operations related to a request to store the data selection to SIS data store 124.

In some examples, step 804 may include data deduplication computing subsystem 102 replacing fingerprints associated with data segments of at least one modified file instance (e.g., fingerprints associated with a file modified in the data selection in local data 114) in a previous version of fingerprint cache 116 to form a new version of fingerprint cache 116. In some examples, the replacement of such fingerprints associated with a modified file instance may include data deduplication computing subsystem 102 adding one or more new fingerprints for new data segments stored to SIS data store 124 and associated with the modified file instance to the new version of fingerprint cache 116 and removing one or more fingerprints associated with outdated segments of a previous version of the modified file instance from the new version of fingerprint cache 116. In this or similar manner, outdated fingerprints no longer associated with a data selection may be removed from fingerprint cache 116 to form a new version of fingerprint cache 116 that includes only up-to-date fingerprints associated with the data selection.

One or more operations performed at step 804 may be performed at one or more various times relative to data deduplication operations (e.g., data deduplication at step 506 of FIG. 5) associated with storage of a data selection to SIS data store 124. In some examples, fingerprints associated with deleted and modified file instances may be removed from fingerprint cache 116 before data deduplication, and fingerprints associated with new file instances may be added to fingerprint cache 116 during data deduplication. In other examples, fingerprints associated with deleted file instances may be removed from fingerprint cache 116 before data deduplication, fingerprints associated with new file instances may be added to fingerprint cache 116 during data deduplication, and fingerprints associated with modified file instances may be replaced during and/or after data deduplication (e.g., new fingerprints associated with the modified file instances may be added during data deduplication, and outdated fingerprints associated with the modified file instances may be removed after data deduplication). The removal of outdated fingerprints associated with modified file instances after data deduplication may allow the fingerprints to be used during data deduplication before being removed and replaced by new fingerprints representing new data in modified file instances.

Step 508 of FIG. 5 may include making one or more updates to fingerprint cache 116 after data deduplication at step 506 of FIG. 5. Step 508 may additionally or alternatively include any other updates to fingerprint cache 116 that are performed after the data deduplication of step 506. Such updates may include any updates made to keep the fingerprints in fingerprint cache 116 consistent with data stored in SIS data store 124 such that fingerprint cache 116 may be leveraged to initialize a fingerprint cache for use in subsequent data deduplication operations. Hence, updates to fingerprint cache 116, including any of those described herein, may be performed at step 804 of FIG. 8 and/or at step 508 of FIG. 5 as may help keep the fingerprints in fingerprint cache 116 consistent with fingerprint data 126 maintained by SIS computing subsystem 104.

Step 508 of FIG. 5 may also include making updates to storage event data 118, which updates may be made before, during, and/or after data deduplication at step 506. Data deduplication computing subsystem 102 may update storage event data 118 such that the information in storage event data 118 is kept consistent with information in server-side storage event data 128. For example, storage event data 118 may be updated after data deduplication to include information only for current file instances of a data selection stored in SIS data store 124. The storage event data 118 may be updated in any suitable way, such as by data deduplication computing subsystem 102 performing one or more updates based on the changes to the data selection detected at step 802 of FIG. 8 and/or on server-side storage event data 128.

By keeping the fingerprints in fingerprint cache 116 and the information in the storage event data 118 consistent with data maintained at SIS computing subsystem 104 across multiple storage events (e.g., backups) of a data selection to SIS data store 124, fingerprint cache 116 and storage event data 118 may be leveraged for client-side data deduplication related to storage of the data selection to SIS data store 124. This may help postpone or avoid full initializations of fingerprint cache 116 for data deduplication, as described above.

Figure 9:
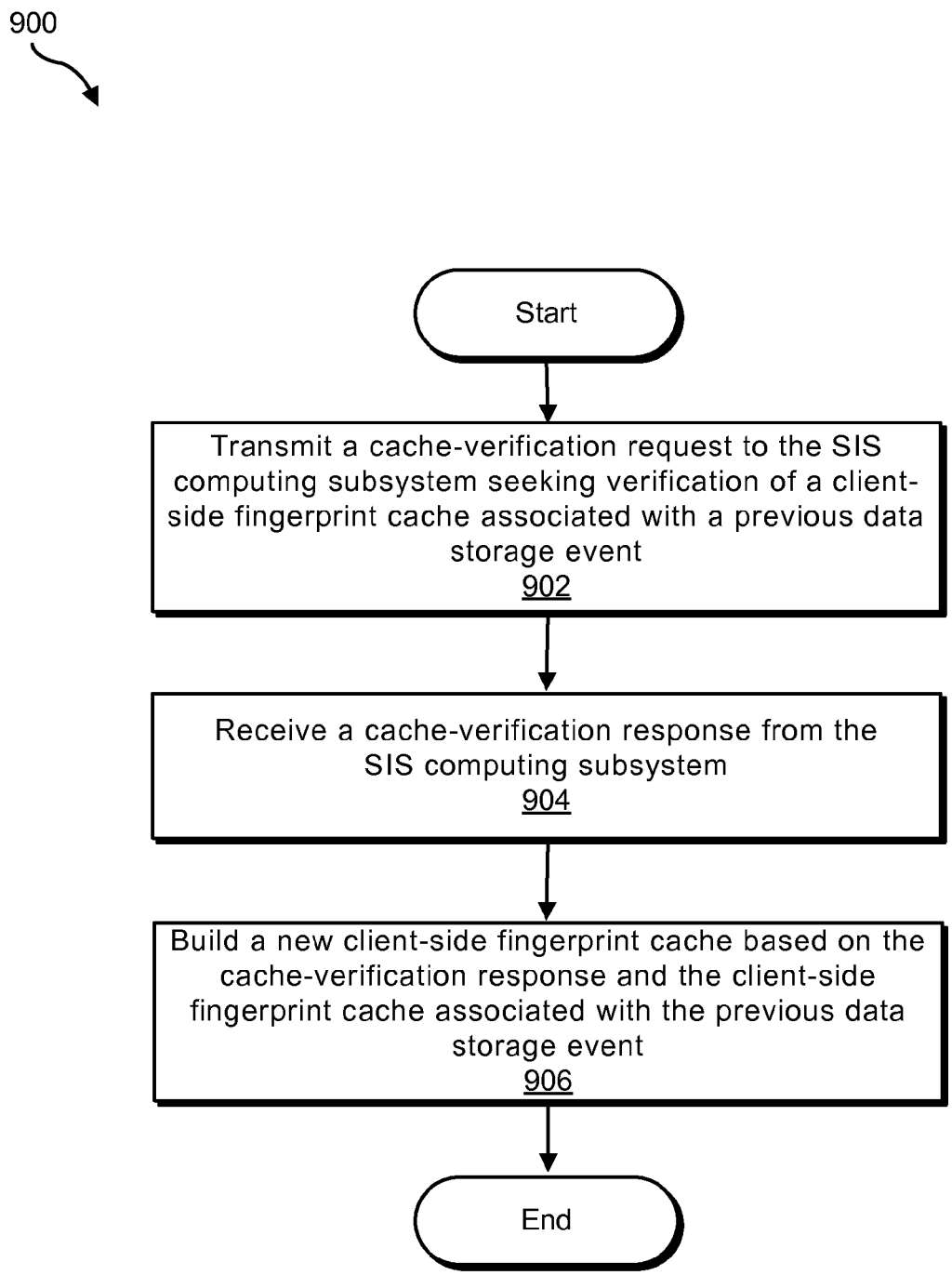
FIG. 9 is a flow diagram of another exemplary method of leveraged initialization of a client-side fingerprint cache according to at least one embodiment.

FIG. 9 illustrates another exemplary method 900 of leveraged initialization of a client-side fingerprint cache. While FIG. 9 illustrates exemplary steps according to one embodiment, other embodiments may omit, add to, reorder, and/or modify any of the steps shown in FIG. 9.

As illustrated in FIG. 9, at step 902 a cache-verification request may be transmitted to SIS computing subsystem 104 seeking verification of a client-side fingerprint cache associated with a previous data storage event. For example, data deduplication computing subsystem 102 may transmit a cache-verification request to SIS computing subsystem 104 seeking verification of a client-side fingerprint cache (a previous version of fingerprint cache 116) associated with a previous storage of a data selection to SIS data store 124.

The cache-verification request may include any information that may be used by SIS computing subsystem 104 to verify whether fingerprints in the client-side fingerprint cache are current with data stored in SIS data store 124. In at least one embodiment, step 902 may include data deduplication computing subsystem 102 transmitting data representative of at least one of the fingerprints in the client-side fingerprint cache to SIS computing subsystem 104, which may compare the fingerprints received from data deduplication computing subsystem 102 to fingerprints in the fingerprint data 126. As another example, data deduplication computing subsystem 102 may compute a fingerprint for a subset of fingerprints in fingerprint cache 116 (e.g., a set of fingerprint such as a set of fingerprints associated with a file instance) and send the computed fingerprint to SIS computing subsystem 104. SIS computing subsystem 104 may compute a fingerprint based on the corresponding subset of fingerprint data 126 and compare the received fingerprint with the server-side computed fingerprint to determine whether a match exists. When matches are found in the fingerprint data 126, the fingerprints in the client-side fingerprint cache, or sets of fingerprints in the client-side fingerprint cache, may be determined to be verified as current representations of data stored in SIS data store 124.

At step 904, a cache-verification response may be received from SIS computing subsystem 104. For example, data deduplication computing subsystem 102 may receive data representative of the cache-verification response from SIS computing subsystem 104 (e.g., via network 206).

SIS computing subsystem 104 may generate and transmit a cache-verification response to data deduplication computing subsystem 102 in response to the request in step 902. The response may indicate which, if any, of the fingerprints in the client-side fingerprint cache are verified and which, if any, of the fingerprints in the client-side fingerprint cache are unverified. The response may be generated and transmitted in any suitable form. In at least one embodiment, for example, the response may comprise a metric (e.g., a bitmap) indicating a verification status for each fingerprint.

At step 906, a new client-side fingerprint cache may be built based on the cache-verification response and the client-side fingerprint cache associated with the previous data storage event. For example, data deduplication computing subsystem 102 may build a new client-side fingerprint cache based on the cache-verification response and the client-side fingerprint cache associated with the previous data storage event.

The new client-side fingerprint cache may be built in any suitable way, including by updating a previous version of fingerprint cache 116 to form a new version of fingerprint cache 116 or by building a new version of fingerprint cache 116 and deleting the previous version of the fingerprint cache 116 based on the cache-verification response and the previous version of the fingerprint cache 116 associated with the previous data storage event.

In certain examples, step 906 may include data deduplication computing subsystem 102 removing, from the previous version of fingerprint cache 116 associated with the previous storage of the data selection to SIS data store 124, any entries associated with fingerprints not verified in the cache-verification response received from SIS computing subsystem 104 to form a new version of fingerprint cache 116. In certain examples, step 906 may include data deduplication computing subsystem 102 building a new client-side fingerprint cache and selectively omitting from the new client-side fingerprint cache any entries associated with fingerprints not verified in the cache-verification response received from SIS computing subsystem 104. Thus, in some examples, the new client-side fingerprint cache may include a subset of the fingerprints included in the client-side fingerprint cache associated with the previous storage of the data selection to the SIS data store 124.

In some examples, step 906 may include data deduplication computing subsystem 102 identifying an unverified fingerprint based on the cache-verification response, identifying a file instance associated with the unverified fingerprint, and removing or selectively omitting all of the fingerprints associated with the file instance from the new client-side fingerprint cache. When even one segment of a file instance is not verified, there may be a possibility that other segments of the file instance are not protected in SIS data store 124 through a current data storage event. That is, a missing segment may indicate that removal of the file instance is in process and that a server-side deletion process may cause the other segments to be removed before completion of a current data storage event. Accordingly, data deduplication computing subsystem 102 may be configured to remove all fingerprints of a file instance having at least one unverified fingerprint.

In certain examples, a segment and/or a segment fingerprint may be associated with multiple file instances. In such examples, step 906 may include deduplication computing subsystem 102 identifying an unverified fingerprint based on the cache-verification response, identifying multiple file instances associated with the unverified fingerprint, and removing or selectively omitting all of the fingerprints associated with the file instances from the new client-side fingerprint cache.

The new version of the fingerprint cache 116 may be stored in storage device 112 and may overwrite the previous version of the fingerprint cache 116. Accordingly, only verified entries of the previous version of fingerprint cache 116 are preserved for use in data deduplication. In this or a similar manner, verified entries of the previous version of fingerprint cache 116 associated with the previous storage of the data selection to SIS data store 124 may be reused for a subsequent storage event, which may help postpone or avoid a full initialization of fingerprint cache 116. In general, verification of fingerprints as described above typically may be more efficient than a full initialization of fingerprint cache 116.

Data deduplication computing subsystem 102 may update the new client-side fingerprint cache. For example, data deduplication computing subsystem 102 may add cache entries for new data segments stored to SIS data store 124 during data deduplication. After data deduplication, the new client-side fingerprint cache may represent the storage of data selection to SIS data store. Hence, the new client-side fingerprint cache may be leveraged for a subsequent request to store the data selection to SIS data store 124.

The exemplary methods of leveraged initialization of a client-side fingerprint cached described above in relation to FIGS. 8-9 are illustrative only. Other embodiments may utilize other ways to leverage a previous client-side fingerprint cache to initialize a new client-side fingerprint cache. For example, SIS computing subsystem 104 may maintain removal event data descriptive of one or more data removal events or processes performed to remove data from SIS data store 124. Such removal event data, which may be stored in storage device 122 and/or may be part of storage event data 128, may include any information descriptive of a data removal event or process and data removed from SIS data store 124 by the data removal event or process.

Data deduplication computing subsystem 102 may be configured to request and receive removal event data from SIS computing subsystem 104. For example, in response to a detected request to store a data selection to SIS data store 124, data deduplication computing subsystem 102 may request that SIS computing subsystem 104 provide any removal event data associated with the data selection. SIS computing subsystem 104 may provide any such removal event data (e.g., removal event data descriptive of one or more data removal events that affected the data selection and that were performed since a previous storage of the data selection to SIS data store 124) to data deduplication computing subsystem 102. Data deduplication computing subsystem 102 may build a new client-side fingerprint cache associated with the data selection based on the client-side fingerprint cache associated with a previous storage of the data selection to SIS data store 124 and on the removal event data received from SIS computing subsystem 104. For instance, data deduplication computing subsystem 102 may modify a previous version of the fingerprint cache 116 by removing fingerprints associated with data segments and/or file instances that have been removed from SIS data store 124, as indicated by the removal event data received from SIS computing subsystem 104. In this manner, data deduplication computing subsystem 102 may leverage an existing client-side fingerprint cache to initialize a client-side fingerprint cache to be used for data deduplication related to a request to store a data selection to SIS data store 124. This particular way of leveraged initialization of a fingerprint cache may be especially efficient when only a small fraction of a data selection has been modified since a previous storage event.

In addition or alternative to the above-described examples of controlling initialization of a client-side fingerprint cache, data deduplication computing subsystem 102 may control initialization of a client-side fingerprint cache by restricting the client-side fingerprint cache to include only fingerprints for data segments associated with file instances having one or more shared attributes. Examples of such attributes may include, without limitation, a size, creation information (e.g., creation date or creator identifier), owner, label, history, number of segments, and any other property of a file instance. For example, data deduplication computing subsystem 102 may restrict a client-side fingerprint cache to include only fingerprints associated with file instances having sizes greater than a predetermined minimum size or smaller than a predetermined maximum size (e.g., measured in bytes). As another example, data deduplication computing subsystem 102 may restrict a client-side fingerprint cache to include only fingerprints associated with file instances having a number of fingerprints greater than a predetermined minimum number of fingerprints. As another example, data deduplication computing subsystem 102 may restrict a client-side fingerprint cache to include only fingerprints associated with file instances having a number of data segments greater than a predetermined minimum number of data segments.

Such a restriction on fingerprints included in the client-side fingerprint cache may help limit the impact (e.g., the memory footprint) of the cache. Other optimizations may also be gained in implementations in which versions of larger file instances are more likely to share common data segments between iterations than are versions of smaller file instances.

One or more of the client-side operations described above, including one or more of the steps shown in FIGS. 5-9 may be performed by one or more components of data deduplication computing subsystem 102, such as by deduplication client 108 executing one or more or the operations and/or directing one or more other components of data deduplication computing subsystem 102 to execute one or more of the operations. Deduplication client 108 may include or be implemented as hardware, computing instructions (e.g., software) embodied on at least one computer-readable medium, or a combination thereof. In at least one embodiment, for example, duplication client 108 may include a software application tangibly embodied on a computer-readable-storage medium (e.g., storage device 112) and configured to direct data deduplication computing subsystem 102 to perform one or more of the client-side operations, including one or more of the steps shown in FIGS. 5-9.

Figure 10:
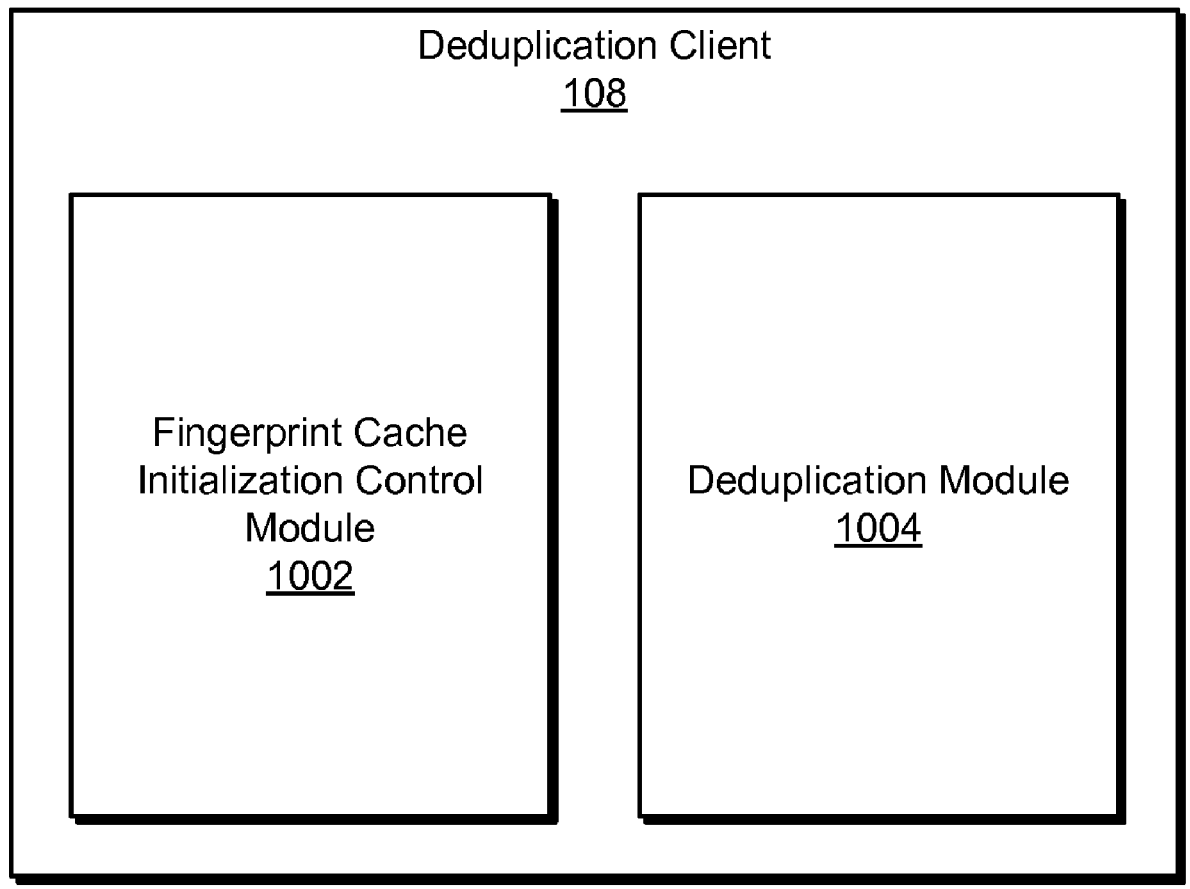
FIG. 10 is a block diagram of exemplary modules of a deduplication client according to at least one embodiment.

FIG. 10 illustrates exemplary modules that may be included in deduplication client 108 and configured to perform and/or direct one or more components of data deduplication computing subsystem 102 to perform one or more of the client-side operations described above. The modules may be implemented in any suitable way, including as computing instructions tangibly embodied on a computer-readable-storage medium (e.g., as components of a software application). As shown in FIG. 10, deduplication client 108 may include a fingerprint cache initialization control module 1002 configured to perform and/or direct one or more components of data deduplication computing subsystem 102 to perform one or more of the operations related to initializing a fingerprint cache (e.g., selectively leveraging a client-side fingerprint cache associated with a previous data storage event to initialize a new client-side fingerprint cache) for use by data deduplication computing subsystem 102 in one or more client-side data deduplication operations, as described above. Deduplication client 108 may also include a deduplication module 1004 configured to perform and/or direct one or more components of data deduplication computing subsystem 102 to perform one or more of the client-side data deduplication operations described above.

In some examples, one or more of the client-side operations described above may utilize cache memory 110, such as for loading local data 114, fingerprint cache 116, and/or storage event data 118 into cache memory 110 for processing. Cache memory 110 may represent any temporary computing memory.

One or more of the operations described above may include and/or cause transformation of data and/or at least one property of storage device 112 or storage device 122. For example, initializing a fingerprint cache as described above may include or cause transformation of data and/or at least one property of storage device 112.

The examples of controlled fingerprint cache initialization for data deduplication described above may provide for efficient cache initializations and may alleviate at least some of the demands placed by full cache initializations on computing resources, such as processing, memory storage, and/or network bandwidth resources.

The exemplary systems and methods for controlling initialization of a fingerprint cache for data deduplication described above may be implemented as may suit a particular application and/or environment. For example, FIG. 11 is a block diagram of an exemplary computing system 1110 capable of implementing one or more of the embodiments described and/or illustrated herein. Computing system 1110 broadly represents any single or multi-processor computing device or system capable of executing computer-readable instructions. Examples of computing system 1110 include, without limitation, workstations, laptops, client-side terminals, servers, distributed computing systems, handheld devices, or any other computing system or device. In its most basic configuration, computing system 1110 may comprise at least one processor 1114 and a system memory 1116.

Processor 1114 generally represents any type or form of processing unit capable of processing data or interpreting and executing instructions. In certain embodiments, processor 1114 may receive instructions from a software application or module. These instructions may cause processor 1114 to perform the functions of one or more of the exemplary embodiments described and/or illustrated herein. For example, processor 1114 may perform and/or be a means for performing, either alone or in combination with other elements, one or more of the controlling, performing, executing, initializing, updating, leveraging, transmitting, sending, receiving, determining, storing, detecting, utilizing, generating, flushing, and building steps described herein. Processor 1114 may also perform and/or be a means for performing any other steps, methods, or processes described and/or illustrated herein.

System memory 1116 generally represents any type or form of volatile or non-volatile storage device or medium capable of storing data and/or other computer-readable instructions. Examples of system memory 1116 include, without limitation, random access memory (RAM), read only memory (ROM), flash memory, or any other suitable memory device. Although not required, in certain embodiments computing system 1110 may comprise both a volatile memory unit (such as, for example, system memory 1116) and a non-volatile storage device (such as, for example, primary storage device 1132, as described in detail below).

In certain embodiments, exemplary computing system 1110 may also comprise one or more components or elements in addition to processor 1114 and system memory 1116. For example, as illustrated in FIG. 11, computing system 1110 may comprise a memory controller 1118, an Input/Output (I/O) controller 1120, and a communication interface 1122, each of which may be interconnected via a communication infrastructure 1112. Communication infrastructure 1112 generally represents any type or form of infrastructure capable of facilitating communication between one or more components of a computing device. Examples of communication infrastructure 1112 include, without limitation, a communication bus (such as an ISA, PCI, PCIe, or similar bus) and a network.

Memory controller 1118 generally represents any type or form of device capable of handling memory or data or controlling communication between one or more components of computing system 1110. For example, in certain embodiments memory controller 1118 may control communication between processor 1114, system memory 1116, and I/O controller 1120 via communication infrastructure 1112. In certain embodiments, memory controller may perform and/or be a means for performing, either alone or in combination with other elements, one or more of the steps or features described and/or illustrated herein, such as controlling, performing, executing, initializing, updating, leveraging, transmitting, sending, receiving, determining, storing, detecting, utilizing, generating, flushing, and building.

I/O controller 1120 generally represents any type or form of module capable of coordinating and/or controlling the input and output functions of a computing device. For example, in certain embodiments I/O controller 1120 may control or facilitate transfer of data between one or more elements of computing system 1110, such as processor 1114, system memory 1116, communication interface 1122, display adapter 1126, input interface 1130, and storage interface 1134. I/O controller 1120 may be used, for example, to perform and/or be a means for performing, either alone or in combination with other elements, one or more of the controlling, performing, executing, initializing, updating, leveraging, transmitting, sending, receiving, determining, storing, detecting, utilizing, generating, flushing, and building steps described herein. I/O controller 1120 may also be used to perform and/or be a means for performing other steps and features set forth in the instant disclosure.

Communication interface 1122 broadly represents any type or form of communication device or adapter capable of facilitating communication between exemplary computing system 1110 and one or more additional devices. For example, in certain embodiments communication interface 1122 may facilitate communication between computing system 1110 and a private or public network comprising additional computing systems. Examples of communication interface 1122 include, without limitation, a wired network interface (such as a network interface card), a wireless network interface (such as a wireless network interface card), a modem, and any other suitable interface. In at least one embodiment, communication interface 1122 may provide a direct connection to a remote server via a direct link to a network, such as the Internet. Communication interface 1122 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1122 may also represent a host adapter configured to facilitate communication between computing system 1110 and one or more additional network or storage devices via an external bus or communications channel. Examples of host adapters include, without limitation, SCSI host adapters, USB host adapters, IEEE 1194 host adapters, SATA and eSATA host adapters, ATA and PATA host adapters, Fibre Channel interface adapters, Ethernet adapters, or the like. Communication interface 1122 may also allow computing system 1110 to engage in distributed or remote computing. For example, communication interface 1122 may receive instructions from a remote device or send instructions to a remote device for execution. In certain embodiments, communication interface 1122 may perform and/or be a means for performing, either alone or in combination with other elements, one or more of the controlling, performing, executing, initializing, updating, leveraging, transmitting, sending, receiving, determining, storing, detecting, utilizing, generating, flushing, and building steps disclosed herein. Communication interface 1122 may also be used to perform and/or be a means for performing other steps and features set forth in the instant disclosure.

Figure 11:
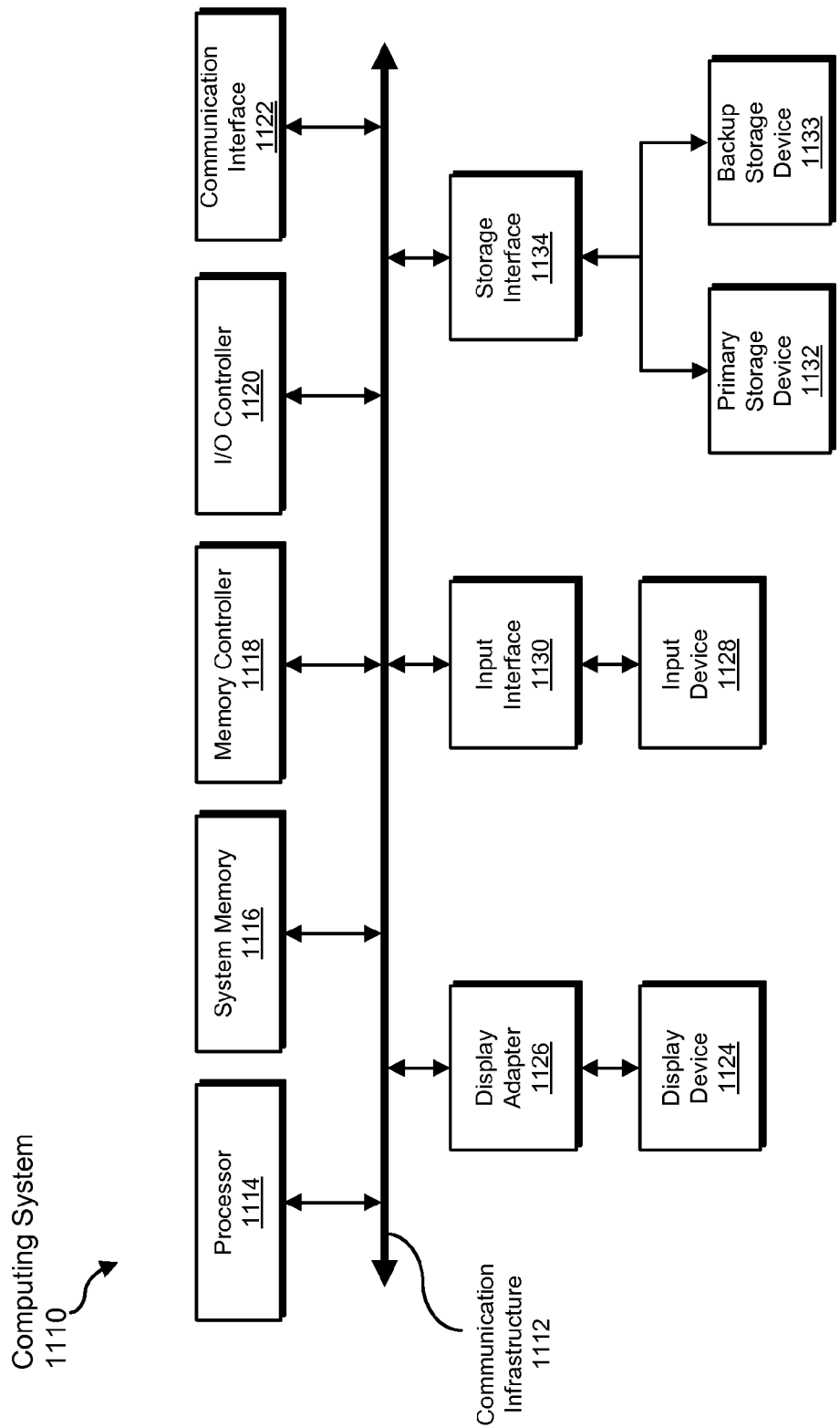
FIG. 11 is a block diagram of an exemplary computing system capable of implementing one or more of the embodiments described and/or illustrated herein.

As illustrated in FIG. 11, computing system 1110 may also comprise at least one display device 1124 coupled to communication infrastructure 1112 via a display adapter 1126. Display device 1124 generally represents any type or form of device capable of visually displaying information forwarded by display adapter 1126. Similarly, display adapter 1126 generally represents any type or form of device configured to forward graphics, text, and other data from communication infrastructure 1112 (or from a frame buffer, as known in the art) for display on display device 1124.

As illustrated in FIG. 11, exemplary computing system 1110 may also comprise at least one input device 1128 coupled to communication infrastructure 1112 via an input interface 1130. Input device 1128 generally represents any type or form of input device capable of providing input, either computer or human generated, to exemplary computing system 1110. Examples of input device 1128 include, without limitation, a keyboard, a pointing device, a speech recognition device, or any other input device. In at least one embodiment, input device 1128 may perform and/or be a means for performing, either alone or in combination with other elements, one or more of the controlling, performing, executing, initializing, updating, leveraging, transmitting, sending, receiving, determining, storing, detecting, utilizing, generating, flushing, and building steps disclosed herein. Input device 1128 may also be used to perform and/or be a means for performing other steps and features set forth in the instant disclosure.

As illustrated in FIG. 11, exemplary computing system 1110 may also comprise a primary storage device 1132 and a backup storage device 1133 coupled to communication infrastructure 1112 via a storage interface 1134. Storage devices 1132 and 1133 generally represent any type or form of storage device or medium capable of storing data and/or other computer-readable instructions. For example, storage devices 1132 and 1133 may be a magnetic disk drive (e.g., a so-called hard drive), a floppy disk drive, a magnetic tape drive, an optical disk drive, a flash drive, or the like. Storage interface 1134 generally represents any type or form of interface or device for transferring data between storage devices 1132 and 1133 and other components of computing system 1110.

In certain embodiments, storage devices 1132 and 1133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1132 and 1133 may also comprise other similar structures or devices for allowing computer software, data, or other computer-readable instructions to be loaded into computing system 1110. For example, storage devices 1132 and 1133 may be configured to read and write software, data, or other computer-readable information. Storage devices 1132 and 1133 may also be a part of computing system 1110 or may be a separate device accessed through other interface systems.

In certain embodiments, storage devices 1132 and 1133 may be used, for example, to perform and/or be a means for performing, either alone or in combination with other elements, one or more of the controlling, performing, executing, initializing, updating, leveraging, transmitting, sending, receiving, determining, storing, detecting, utilizing, generating, flushing, and building steps disclosed herein. Storage devices 1132 and 1133 may also be used to perform and/or be a means for performing other steps and features set forth in the instant disclosure.

Many other devices or subsystems may be connected to computing system 1100. Conversely, all of the components and devices illustrated in FIG. 11 need not be present to practice the embodiments described and/or illustrated herein. The devices and subsystems referenced above may also be interconnected in different ways from that shown in FIG. 11. Computing system 1110 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" or "computer-readable-storage medium" generally refers to any form of device, carrier, or medium capable of storing or carrying and/or storing computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 1110. All or a portion of the computer program stored on the computer-readable medium may then be stored in system memory 1116 and/or various portions of storage devices 1132 and 1133. When executed by processor 1114, a computer program loaded into computing system 1110 may cause processor 1114 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1110 may be configured as an application specific integrated circuit (ASIC) adapted to implement one or more of the exemplary embodiments disclosed herein.

Figure 12:
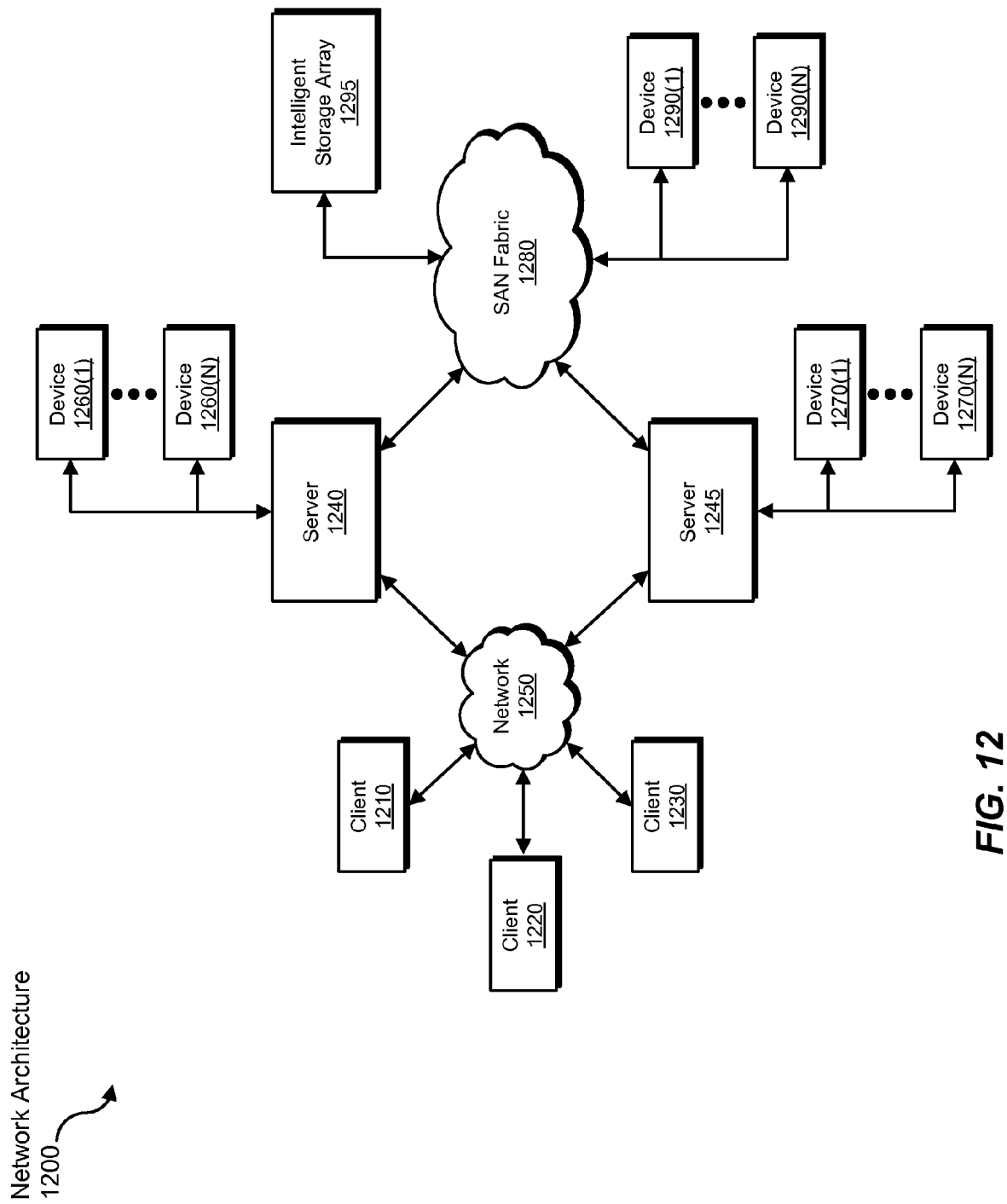
FIG. 12 is a block diagram of an exemplary computing network capable of implementing one or more of the embodiments described and/or illustrated herein.

FIG. 12 is a block diagram of an exemplary network architecture 1200 in which client systems 1210, 1220, and 1230 and servers 1240 and 1245 may be coupled to a network 1250. Client systems 1210, 1220, and 1230 generally represent any type or form of computing device or system, such as exemplary computing system 1110 in FIG. 11. Similarly, servers 1240 and 1245 generally represent computing devices or systems, such as application servers or database servers, configured to provide various database services and/or run certain software applications. Network 1250 generally represents any telecommunication or computer network including, for example, an intranet, a wide area network (WAN), a local area network (LAN), a personal area network (PAN), or the Internet.

As illustrated in FIG. 12, one or more storage devices 1260(1)-(N) may be directly attached to server 1240. Similarly, one or more storage devices 1270(1)-(N) may be directly attached to server 1245. Storage devices 1260(1)-(N) and storage devices 1270(1)-(N) generally represent any type or form of storage device or medium capable of storing data and/or other computer-readable instructions. In certain embodiments, storage devices 1260(1)-(N) and storage devices 1270(1)-(N) may represent network-attached storage (NAS) devices configured to communicate with servers 1240 and 1245 using various protocols, such as NFS, SMB, or CIFS.

Servers 1240 and 1245 may also be connected to a storage area network (SAN) fabric 1280. SAN fabric 1280 generally represents any type or form of computer network or architecture capable of facilitating communication between a plurality of storage devices. SAN fabric 1280 may facilitate communication between servers 1240 and 1245 and a plurality of storage devices 1290(1)-(N) and/or an intelligent storage array 1295. SAN fabric 1280 may also facilitate, via network 1250 and servers 1240 and 1245, communication between client systems 1210, 1220, and 1230 and storage devices 1290(1)-(N) and/or intelligent storage array 1295 in such a manner that devices 1290(1)-(N) and array 1295 appear as locally attached devices to client systems 1210, 1220, and 1230. As with storage devices 1260(1)-(N) and storage devices 1270(1)-(N), storage devices 1290(1)-(N) and intelligent storage array 1295 generally represent any type or form of storage device or medium capable of storing data and/or other computer-readable instructions.

In certain embodiments, and with reference to exemplary computing system 1110 of FIG. 11, a communication interface, such as communication interface 1122 in FIG. 11, may be used to provide connectivity between each client system 1210, 1220, and 1230 and network 1250. Client systems 1210, 1220, and 1230 may be able to access information on server 1240 or 1245 using, for example, a web browser or other client software. Such software may allow client systems 1210, 1220, and 1230 to access data hosted by server 1240, server 1245, storage devices 1260(1)-(N), storage devices 1270(1)-(N), storage devices 1290(1)-(N), or intelligent storage array 1295. Although FIG. 12 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1240, server 1245, storage devices 1260(1)-(N), storage devices 1270(1)-(N), storage devices 1290(1)-(N), intelligent storage array 1295, or any combination thereof. All or a portion of one or more of the exemplary embodiments disclosed herein may also be encoded as a computer program, stored in server 1240, run by server 1245, and distributed to client systems 1210, 1220, and 1230 over network 1250. Accordingly, network architecture 1200 may perform and/or be a means for controlling, performing, executing, initializing, updating, leveraging, transmitting, sending, receiving, determining, storing, detecting, utilizing, generating, flushing, and building steps disclosed herein. Network architecture 1200 may also be used to perform and/or be a means for performing other steps and features set forth in the instant disclosure.

While certain examples described above illustrate a single client-side data deduplication computing subsystem 102 in communication with server-side SIS computing subsystem 104, this is illustrative only and not limiting in any sense. In certain embodiments, multiple client-side data deduplication computing subsystems 102 may be in communication with server-side SIS computing subsystem 104 and may be configured to control initialization of one or more client-side fingerprint caches in any of the ways described above.

As detailed above, computing system 1110 and/or one or more components of network architecture 1200 may perform and/or be a means for performing, either alone or in combination with other elements, one or more steps of an exemplary method for controlling initialization of a fingerprint cache for data deduplication associated with a single-instance-storage computing subsystem such as SIS computing subsystem 104. In one example, a method for performing such a task may comprise: 1) detecting a request to store a data selection to the single-instance-storage computing subsystem, 2) leveraging a client-side fingerprint cache associated with a previous storage of the data selection to the single-instance-storage computing subsystem to initialize a new client-side fingerprint cache, and 3) utilizing the new client-side fingerprint cache for data deduplication associated with the request to store the data selection to the single-instance-storage computing subsystem.

In some examples, the leveraging step may comprise: 1) utilizing client-side storage event data to detect at least one change made to the data selection since the previous storage of the data selection to the single-instance-storage computing subsystem and 2) updating the client-side fingerprint cache associated with the previous storage of the data selection to the single-instance-storage computing subsystem to form the new client-side fingerprint cache reflecting the at least one change to the data selection. In some examples, the at least one change may comprise a deletion of at least one file instance from the data selection since the previous storage of the data selection to the single-instance-storage computing subsystem, and the updating step may comprise removing from the client-side fingerprint cache one or more fingerprints associated with the at least one deleted file instance.

In some examples, the at least one change may further comprise a modification to at least one file instance in the data selection since the previous storage of the data selection to the single-instance-storage computing subsystem, and the updating step may comprise replacing one or more fingerprints associated with the at least one modified file instance. In some examples, the removing step may be performed before the data deduplication, and the replacing step may be performed at least one of during and after the data deduplication. In some examples, the replacing step may comprise: 1) adding one or more new fingerprints associated with the at least one modified file instance to the new client-side fingerprint cache during data deduplication and 2) removing the one or more fingerprints associated with a previous version of the at least one modified file instance from the new client-side fingerprint cache after data deduplication.

In some examples, the utilizing step may comprise comparing information descriptive of a current version of at least one file instance in the data selection with information descriptive of the at least one file instance associated with the previous storage of the data selection to the single-instance-storage computing subsystem.

In some examples, the leveraging step may comprise: 1) transmitting a cache-verification request to the single-instance-storage computing subsystem seeking verification of one or more fingerprints in the client-side fingerprint cache associated with the previous storage of the data selection to the single-instance-storage computing subsystem, 2) receiving a cache-verification response from the single-instance-storage computing subsystem, and 3) building the new client-side fingerprint cache based on the cache-verification response and the client-side fingerprint cache associated with the previous storage of the data selection to the single-instance-storage computing subsystem. In some examples, the building step may comprise selectively omitting, based on the cache-verification response, at least one fingerprint included in the client-side fingerprint cache associated with the previous storage of the data selection to the single-instance-storage computing subsystem from the new client-side fingerprint cache. In some examples, the new client-side fingerprint cache may include a subset of fingerprints included in the client-side fingerprint cache associated with the previous storage of the data selection to the single-instance-storage computing subsystem. In some examples, the transmitting step may comprise transmitting, to the single-instance-storage computing subsystem, data representative of at least one fingerprint included in the client-side fingerprint cache associated with the previous storage of the data selection to the single-instance-storage computing subsystem.

In some examples, the method may further comprise restricting the client-side fingerprint cache to include only fingerprints associated with file instances having an attribute greater than a predetermined minimum threshold. In some examples, the attribute greater than the predetermined minimum threshold may comprise one of: 1) a file size greater than a predetermined minimum file size and 2) a number of fingerprints greater than a predetermined minimum number of fingerprints.

In some examples, the method may further comprise: 1) determining whether the client-side fingerprint cache associated with the previous storage of the data selection to the single-instance-storage computing subsystem is valid and 2) selectively performing the leveraging step when the client-side fingerprint cache associated with the previous storage of the data selection to the single-instance-storage computing subsystem is determined to be valid.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature at least because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for controlling initialization of a fingerprint cache for data deduplication associated with a single-instance-storage computing subsystem, at least a portion of the method being performed by a computing system having at least one processor, the method comprising:
   detecting a request to store a data selection to the single-instance-storage computing subsystem;
   leveraging a client-side fingerprint cache associated with a previous storage of the data selection to the single-instance-storage computing subsystem to initialize a new client-side fingerprint cache;
   utilizing the new client-side fingerprint cache for data deduplication associated with the request to store the data selection to the single-instance-storage computing subsystem.

2. The method of claim 1, wherein the leveraging of the client-side fingerprint cache associated with the previous storage of the data selection to the single-instance-storage computing subsystem to initialize the new client-side fingerprint cache comprises:
   utilizing client-side storage event data to detect at least one change made to the data selection since the previous storage of the data selection to the single-instance-storage computing subsystem;
   updating the client-side fingerprint cache associated with the previous storage of the data selection to the single-instance-storage computing subsystem to form the new client-side fingerprint cache reflecting the at least one change to the data selection.

3. The method of claim 2, wherein:
   the at least one change comprises a deletion of at least one file instance from the data selection since the previous storage of the data selection to the single-instance-storage computing subsystem;
   the updating of the client-side fingerprint cache associated with the previous storage of the data selection to the single-instance-storage computing subsystem to form the new client-side fingerprint cache reflecting the at least one change to the data selection comprises removing from the client-side fingerprint cache one or more fingerprints associated with the at least one deleted file instance.

4. The method of claim 3, wherein:
   the at least one change further comprises a modification to at least one file instance in the data selection since the previous storage of the data selection to the single-instance-storage computing subsystem;
   the updating of the client-side fingerprint cache associated with the previous storage of the data selection to the single-instance-storage computing subsystem to form the new client-side fingerprint cache reflecting the at least one change to the data selection further comprises replacing one or more fingerprints associated with the at least one modified file instance.

5. The method of claim 4, wherein:
   the removing of the one or more fingerprints associated with the at least one deleted file instance is performed before the data deduplication;
   the replacing of the one or more fingerprints associated with the at least one modified file instance is performed at least one of during and after the data deduplication.

6. The method of claim 5, wherein:
   the replacing of the one or more fingerprints associated with the at least one modified file instance comprises:
      adding one or more new fingerprints associated with the at least one modified file instance to the new client-side fingerprint cache during data deduplication;
      removing the one or more fingerprints associated with a previous version of the at least one modified file instance from the new client-side fingerprint cache after data deduplication.

7. The method of claim 2, wherein the utilizing of the client-side storage event data to detect the at least one change made to the data selection since the previous storage of the data selection to the single-instance-storage computing subsystem comprises comparing information descriptive of a current version of at least one file instance in the data selection with information descriptive of a previous version of at least one file instance associated with the previous storage of the data selection to the single-instance-storage computing subsystem.

8. The method of claim 1, wherein the leveraging of the client-side fingerprint cache associated with the previous storage of the data selection to the single-instance-storage computing subsystem to initialize the new client-side fingerprint cache comprises:
   transmitting a cache-verification request to the single-instance-storage computing subsystem seeking verification of one or more fingerprints included in the client-side fingerprint cache associated with the previous storage of the data selection to the single-instance-storage computing subsystem;
   receiving a cache-verification response from the single-instance-storage computing subsystem;
   building the new client-side fingerprint cache based on the cache-verification response and the client-side fingerprint cache associated with the previous storage of the data selection to the single-instance-storage computing subsystem.

9. The method of claim 8, wherein the building of the new client-side fingerprint cache comprises:
selectively omitting, based on the cache-verification response, at least one fingerprint included in the client-side fingerprint cache associated with the previous storage of the data selection to the single-instance-storage computing subsystem from the new client-side fingerprint cache.

10. The method of claim 8, wherein the new client-side fingerprint cache includes a subset of the one or more fingerprints included in the client-side fingerprint cache associated with the previous storage of the data selection to the single-instance-storage computing subsystem.

11. The method of claim 8, wherein transmitting the cache-verification request to the single-instance-storage computing subsystem comprises transmitting, to the single-instance-storage computing subsystem, data representative of at least one fingerprint included in the client-side fingerprint cache associated with the previous storage of the data selection to the single-instance-storage computing subsystem.

12. The method of claim 1, further comprising restricting the client-side fingerprint cache to include only fingerprints associated with file instances having a particular shared attribute.

13. The method of claim 12, wherein the attribute comprises a size of the file instance that is greater than a predetermined minimum threshold size.

14. The method of claim 1, further comprising:
determining whether the client-side fingerprint cache associated with the previous storage of the data selection to the single-instance-storage computing subsystem is valid;
selectively performing the leveraging of the client-side fingerprint cache associated with the previous storage of the data selection to the single-instance-storage computing subsystem to initialize the new client-side fingerprint cache when the client-side fingerprint cache associated with the previous storage of the data selection to the single-instance-storage computing subsystem is determined to be valid.

15. A system for controlling initialization of a fingerprint cache for data deduplication, the system comprising:
at least one processor;
a duplication client that directs the at least one processor to:
detect a request to store a data selection to a single-instance-storage computing subsystem;
leverage a client-side fingerprint cache associated with a previous storage of the data selection to the single-instance-storage computing subsystem to initialize a new client-side fingerprint cache;
utilize the new client-side fingerprint cache for data deduplication associated with the request to store the data selection to the single-instance-storage computing subsystem.

16. The system of claim 15, wherein the duplication client directs the at least one processor to leverage the client-side fingerprint cache associated with the previous storage of the data selection to the single-instance-storage computing subsystem to initialize the new client-side fingerprint cache by:
utilizing client-side storage event data to detect at least one change made to the data selection since the previous storage of the data selection to the single-instance-storage computing subsystem;
updating the client-side fingerprint cache associated with the previous storage of the data selection to the single-instance-storage computing subsystem to form the new client-side fingerprint cache reflecting the at least one change to the data selection.

17. The system of claim 15, wherein the duplication client directs the at least one processor to leverage the client-side fingerprint cache associated with the previous storage of the data selection to the single-instance-storage computing subsystem to initialize the new client-side fingerprint cache by:
transmitting a cache-verification request to the single-instance-storage computing subsystem seeking verification of one or more fingerprints in the client-side fingerprint cache associated with the previous storage of the data selection to the single-instance-storage computing subsystem;
receiving a cache-verification response from the single-instance-storage computing subsystem;
building the new client-side fingerprint cache based on the cache-verification response and the client-side fingerprint cache associated with the previous storage of the data selection to the single-instance-storage computing subsystem.

18. A non-transitory computer-readable-storage medium comprising one or more computer-executable instructions that, when executed by a computing device comprising at least one processor, cause the computing device to:
detect a request to store a data selection to a single-instance-storage computing subsystem;
leverage a client-side fingerprint cache associated with a previous storage of the data selection to the single-instance-storage computing subsystem to initialize a new client-side fingerprint cache;
utilize the new client-side fingerprint cache for data deduplication associated with the request to store the data selection to the single-instance-storage computing subsystem.

19. The non-transitory computer-readable-storage medium of claim 18, wherein the one or more computer-executable instructions cause the computing device to leverage the client-side fingerprint cache associated with the previous storage of the data selection to the single-instance-storage computing subsystem to initialize the new client-side fingerprint cache by:
utilizing client-side storage event data to detect at least one change made to the data selection since the previous storage of the data selection to the single-instance-storage computing subsystem;
updating the client-side fingerprint cache associated with the previous storage of the data selection to the single-instance-storage computing subsystem to form the new client-side fingerprint cache reflecting the at least one change to the data selection.

20. The non-transitory computer-readable-storage medium of claim 18, wherein the one or more computer-executable instructions cause the computing device to leverage the client-side fingerprint cache associated with the previous storage of the data selection to the single-instance-storage computing subsystem to initialize the new client-side fingerprint cache by:

transmitting a cache-verification request to the single-instance-storage computing subsystem seeking verification of one or more fingerprints in the client-side fingerprint cache associated with the previous storage of the data selection to the single-instance-storage computing subsystem;

receiving a cache-verification response from the single-instance-storage computing subsystem;

building the new client-side fingerprint cache based on the cache-verification response and the client-side fingerprint cache associated with the previous storage of the data selection to the single-instance-storage computing subsystem.

\* \* \* \* \*